US007005793B2

(12) United States Patent
George et al.

(10) Patent No.: US 7,005,793 B2
(45) Date of Patent: Feb. 28, 2006

(54) SOCKET FOR USE WITH A MICRO-COMPONENT IN A LIGHT-EMITTING PANEL

(75) Inventors: Edward Victor George, Lake Arrowhead, CA (US); Roger Laverne Johnson, Encinitas, CA (US); Albert Myron Green, Springfield, VA (US); Newell Convers Wyeth, Oakton, VA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 11/135,538

(22) Filed: May 24, 2005

(65) Prior Publication Data

US 2005/0206317 A1 Sep. 22, 2005

Related U.S. Application Data

(60) Division of application No. 10/643,608, filed on Aug. 20, 2003, now Pat. No. 6,902,456, which is a continuation of application No. 10/318,150, filed on Dec. 13, 2002, now Pat. No. 6,646,388, which is a continuation of application No. 09/697,346, filed on Oct. 27, 2000, now Pat. No. 6,545,422.

(51) Int. Cl.
*H01J 1/62* (2006.01)

(52) U.S. Cl. ...................................... 313/484; 313/582

(58) Field of Classification Search ........ 313/483–484, 313/582–587, 491–493
See application file for complete search history.

(56) References Cited

U.S. PATENT DOCUMENTS

| | | | | |
|---|---|---|---|---|
| 3,559,190 | A | 1/1971 | Blitzer et al. | 340/173 |
| 3,646,384 | A | 2/1972 | Lay | 313/109.5 |
| 3,704,052 | A | 11/1972 | Coleman | 316/17 |
| 3,755,027 | A | 8/1973 | Gilsing | 156/67 |
| 3,848,248 | A | 11/1974 | MacIntyre, Jr. | 340/324 M |
| 3,969,651 | A | 7/1976 | Greeson, Jr. | 315/169 TV |
| 3,990,068 | A | 11/1976 | Mayer et al. | 340/324 M |
| 3,998,618 | A | 12/1976 | Kreick et al. | 65/105 |
| 4,027,246 | A | 5/1977 | Caccoma et al. | 235/151.1 |
| 4,035,690 | A | 7/1977 | Roeber | 315/169 TV |
| 4,303,433 | A | 12/1981 | Torobin | 65/21.4 |
| 4,379,301 | A | 4/1983 | Fischbeck | 346/1.1 |
| 4,386,358 | A | 5/1983 | Fischbeck | 346/1.1 |
| 4,393,326 | A | 7/1983 | Kamegaya et al. | 313/582 |
| 4,429,303 | A | 1/1984 | Aboelfotoh | 340/701 |
| 4,534,743 | A | 8/1985 | D'Onofrio et, al. | 445/24 |
| 4,554,537 | A | 11/1985 | Dick | 340/775 |
| 4,563,617 | A | 1/1986 | Davidson | 315/312 |
| 4,591,847 | A | 5/1986 | Criscimagna et al. | 340/776 |
| 4,654,561 | A | 3/1987 | Shelton | 315/111.71 |

(Continued)

FOREIGN PATENT DOCUMENTS

JP 4-287397 10/1992

(Continued)

OTHER PUBLICATIONS

Preliminary Examination Report for Application No. PCT/US01/42782, dated Jun. 4, 2003 (mailing date).

(Continued)

*Primary Examiner*—Joseph Williams
(74) *Attorney, Agent, or Firm*—Kilpatrick Stockton LLP

(57) ABSTRACT

An improved light-emitting panel having a plurality of micro-components at least partially disposed in a socket and sandwiched between two substrates is disclosed. Each micro-component contains a gas or gas-mixture capable of ionization when a sufficiently large voltage is supplied across the micro-component via at least two electrodes.

6 Claims, 18 Drawing Sheets

U.S. PATENT DOCUMENTS

| | | | | |
|---|---|---|---|---|
| 4,658,269 | A | 4/1987 | Rezanka | 346/75 |
| 4,697,123 | A | 9/1987 | Shinoda et al. | 315/169.4 |
| 4,728,864 | A | 3/1988 | Dick | 315/169.3 |
| 4,833,463 | A | 5/1989 | Dick et al. | 340/775 |
| 4,843,281 | A | 6/1989 | Mendelsohn | 313/587 |
| 4,887,003 | A | 12/1989 | Parker | 313/634 |
| 4,912,364 | A | 3/1990 | Hollo et al. | 313/623 |
| 5,019,807 | A | 5/1991 | Stapleton et al. | 340/718 |
| 5,030,888 | A | 7/1991 | Salavin et al. | 315/169.4 |
| 5,062,916 | A | 11/1991 | Aufderheide et al. | 156/269 |
| 5,068,916 | A | 11/1991 | Harrison et al. | 455/39 |
| 5,075,597 | A | 12/1991 | Deschamps, et al. | 315/169.4 |
| 5,126,632 | A | 6/1992 | Parker | 313/634 |
| 5,150,007 | A | 9/1992 | Andreadakis | 313/586 |
| 5,315,129 | A | 5/1994 | Forrest et al. | 257/21 |
| 5,396,149 | A | 3/1995 | Kwon | 313/486 |
| 5,500,287 | A | 3/1996 | Henderson | 428/403 |
| 5,501,871 | A | 3/1996 | Henderson | 427/160 |
| 5,510,678 | A | 4/1996 | Sakai et al. | 315/58 |
| 5,514,934 | A | 5/1996 | Matsumoto et al. | 313/607 |
| 5,674,351 | A | 10/1997 | Lovoi | 156/629.1 |
| 5,675,212 | A | 10/1997 | Schmid et al. | 313/422 |
| 5,686,790 | A | 11/1997 | Curtin et al. | 313/493 |
| 5,703,436 | A | 12/1997 | Forrest et al. | 313/506 |
| 5,707,745 | A | 1/1998 | Forrest et al. | 428/432 |
| 5,721,160 | A | 2/1998 | Forrest et al. | 438/28 |
| 5,725,787 | A | 3/1998 | Curtin et al. | 216/25 |
| 5,746,635 | A | 5/1998 | Spindt et al. | 445/24 |
| 5,747,931 | A | 5/1998 | Riddle et al. | 313/581 |
| 5,755,944 | A | 5/1998 | Haven et al. | 204/486 |
| 5,757,026 | A | 5/1998 | Forrest et al. | 257/40 |
| 5,757,131 | A | 5/1998 | Tsuchiya | 375/582 |
| 5,757,139 | A | 5/1998 | Forrest et al. | 315/169.3 |
| 5,777,782 | A | 7/1998 | Sheridon | 359/296 |
| 5,788,814 | A | 8/1998 | Sun et al. | 204/297 R |
| 5,793,158 | A | 8/1998 | Wedding, Sr. | 313/493 |
| 5,798,604 | A | 8/1998 | Duboc, Jr. et al. | 313/495 |
| 5,808,403 | A | 9/1998 | Clerc | 313/336 |
| 5,811,833 | A | 9/1998 | Thompson | 257/40 |
| 5,815,306 | A | 9/1998 | Sheridon et al. | 359/296 |
| 5,825,451 | A | 10/1998 | Ma et al. | 349/187 |
| 5,837,221 | A | 11/1998 | Bernstein et al. | 424/9.52 |
| 5,844,363 | A | 12/1998 | Gu et al. | 313/506 |
| 5,853,446 | A | 12/1998 | Carre et al. | 65/17.3 |
| 5,862,054 | A | 1/1999 | Li | 364/468.28 |
| 5,865,657 | A | 2/1999 | Haven et al. | 445/24 |
| 5,897,414 | A | 4/1999 | Bergeron et al. | 445/3 |
| 5,898,266 | A | 4/1999 | Spindt et al. | 313/495 |
| 5,913,704 | A | 6/1999 | Spindt et al. | 445/24 |
| 5,914,150 | A | 6/1999 | Porter et al. | 427/77 |
| 5,917,646 | A | 6/1999 | Sheridon | 359/296 |
| 5,920,080 | A | 7/1999 | Jones | 257/40 |
| 5,945,174 | A | 8/1999 | Shaw et al. | 427/509 |
| 5,949,513 | A | 9/1999 | Ma et al. | 349/187 |
| 5,953,587 | A | 9/1999 | Forrest et al. | 438/99 |
| 5,964,630 | A | 10/1999 | Slusarczuk et al. | 445/25 |
| 5,965,109 | A | 10/1999 | Lohrmann | 424/9.52 |
| 5,967,871 | A | 10/1999 | Kaake et al. | 445/24 |
| 5,969,472 | A | 10/1999 | Kisner | 313/484 |
| 5,975,683 | A | 11/1999 | Smith et al. | 347/55 |
| 5,984,747 | A | 11/1999 | Bhagavatula et al. | 445/24 |
| 5,985,460 | A | 11/1999 | Wang et al. | 428/426 |
| 5,986,409 | A | 11/1999 | Farnworth et al. | 315/169.4 |
| 5,990,614 | A | 11/1999 | Spindt | 313/495 |
| 5,990,620 | A | 11/1999 | Lepselter | 313/585 |
| 6,002,198 | A | 12/1999 | Spindt et al. | 313/292 |
| 6,013,538 | A | 1/2000 | Burrows et al. | 438/22 |
| 6,017,584 | A | 1/2000 | Albert et al. | 427/213.3 |
| 6,019,657 | A | 2/2000 | Chakvorty et al. | 445/24 |
| 6,022,652 | A | 2/2000 | Haven et al. | 430/26 |
| 6,023,259 | A | 2/2000 | Howard et al. | 345/76 |
| 6,025,097 | A | 2/2000 | Drumm | 430/7 |
| 6,030,269 | A | 2/2000 | Drumm | 445/52 |
| 6,030,715 | A | 2/2000 | Thompson et al. | 428/690 |
| 6,033,547 | A | 3/2000 | Trau et al. | 204/622 |
| 6,037,710 | A | 3/2000 | Poole et al. | 313/422 |
| 6,037,918 | A | 3/2000 | Hansen et al. | 345/74 |
| 6,038,002 | A | 3/2000 | Song | 349/43 |
| 6,039,619 | A | 3/2000 | Kang et al. | 445/24 |
| 6,045,930 | A | 4/2000 | Thompson et al. | 428/690 |
| 6,046,543 | A | 4/2000 | Bulovic et al. | 313/504 |
| 6,048,469 | A | 4/2000 | Xiang et al. | 252/301.6 R |
| 6,048,630 | A | 4/2000 | Burrows et al. | 428/690 |
| 6,049,366 | A | 4/2000 | Hakemi et al. | 349/86 |
| 6,069,443 | A | 5/2000 | Jones et al. | 313/504 |
| 6,072,276 | A | 6/2000 | Okajima | 313/581 |
| 6,079,814 | A | 6/2000 | Lean et al. | 347/55 |
| 6,080,606 | A | 6/2000 | Gleskova et al. | 438/151 |
| 6,087,196 | A | 7/2000 | Sturm et al. | 438/29 |
| 6,091,195 | A | 7/2000 | Forrest et al. | 313/504 |
| 6,091,380 | A | 7/2000 | Hashimoto et al. | 345/60 |
| 6,091,874 | A | 7/2000 | Higashi et al. | 384/130 |
| 6,097,147 | A | 8/2000 | Baldo et al. | 313/506 |
| 6,130,655 | A | 10/2000 | Lammers | 345/72 |
| 6,137,553 | A | 10/2000 | Izumi et al. | 349/49 |
| 6,201,518 | B1 | 3/2001 | Kane et al. | 345/60 |
| 6,255,777 | B1 | 7/2001 | Kim et al. | 313/582 |
| 6,262,706 | B1 | 7/2001 | Albert et al. | 345/107 |
| 6,265,826 | B1 | 7/2001 | Miyazaki | 313/586 |
| 6,281,863 | B1 | 8/2001 | Sasaki et al. | 345/60 |
| 6,285,129 | B1 | 9/2001 | Park et al. | 313/586 |
| 6,285,434 | B1 | 9/2001 | Ma et al. | 349/189 |
| 6,288,488 | B1 | 9/2001 | Amemiya | 313/582 |
| 6,288,693 | B1 | 9/2001 | Song et al. | 345/68 |
| 6,291,925 | B1 | 9/2001 | Jacobson | 310/319 |
| 6,292,159 | B1 | 9/2001 | Someya et al. | 345/60 |
| 6,292,160 | B1 | 9/2001 | Mikoshiba et al. | 345/60 |
| 6,295,040 | B1 | 9/2001 | Nhan et al. | 345/60 |
| 6,296,539 | B1 | 10/2001 | Awaji et al. | 445/24 |
| 6,297,590 | B1 | 10/2001 | Nanto et al. | 313/586 |
| 6,300,152 | B1 | 10/2001 | Kim | 438/30 |
| 6,300,932 | B1 | 10/2001 | Albert | 345/107 |
| 6,304,031 | B1 | 10/2001 | Wani et al. | 313/582 |
| 6,304,032 | B1 | 10/2001 | Asano | 313/582 |
| 6,304,238 | B1 | 10/2001 | Tsuchida | 345/87 |
| 6,307,319 | B1 | 10/2001 | Lee | 313/590 |
| 6,312,304 | B1 | 11/2001 | Duthaler et al. | 445/24 |
| 6,312,971 | B1 | 11/2001 | Amundson et al. | 438/99 |
| 6,319,325 | B1 | 11/2001 | Hiratsuka et al. | 118/718 |
| 6,322,010 | B1 | 11/2001 | Sasaki et al. | 239/568 |
| 6,459,201 | B1 * | 10/2002 | Schermerhorn et al. | 313/586 |
| 2001/0008825 | A1 | 7/2001 | Toyoda, et al. | 445/24 |
| 2001/0033256 | A1 | 10/2001 | Moore | 345/60 |
| 2001/0053570 | A1 | 12/2001 | Kido | 438/149 |
| 2002/0008470 | A1 | 1/2002 | Uegaki, et al. | 313/567 |
| 2002/0009536 | A1 | 1/2002 | Iguchi, et al. | 427/10 |
| 2002/0016075 | A1 | 2/2002 | Peng, et al. | 438/700 |
| 2002/0017864 | A1 | 2/2002 | Watanabe, et al. | 313/586 |
| 2002/0022565 | A1 | 2/2002 | Sreeram, et al. | 501/16 |
| 2002/0024295 | A1 | 2/2002 | Miyashita, et al. | 313/495 |

FOREIGN PATENT DOCUMENTS

| | | |
|---|---|---|
| JP | 10-3869 | 1/1998 |
| WO | WO 00/36465 | 6/2000 |

OTHER PUBLICATIONS

Written Opinion for Application No. PCT/US01/42782, dated Dec. 31, 2002 (mailing date).

International Search Report for Application No. PCT/US01/42805, dated Apr. 3, 2003 (mailing date).

International Search Report for Application No. PCT/US01/42803, dated Dec. 9, 2002 (mailing date).

Preliminary Examination Report for Application No. PCT/US01/42807, dated Dec. 8, 2002 (mailing date).
International Search Report for Application No. PCT/US01/51439, dated Sep. 23, 2002 (mailing date).
Written Opinion for Application No. PCT/US01/42807, dated Sep. 17, 2002 (mailing date).
International Search Report for Application No. PCT/US01/42807, dated May 20, 2002 (mailing date).
International Search Report for Application No. PCT/US01/42782, dated Apr. 11, 2002 (mailing date).
Sheats, James, "Introduction to Organic Light Emitting Diodes (OLEDs)" [online], [retrieved on May 9, 2002], 8 pp., Retrieved from the Internet: http://www.rolltronics.com/intro_oled.htm.
Sauvante, Michael, "Roll-to-Roll Manufacturing" [online], [retrieved on May, 9, 2002], 4 pp., Retrieved from the Internet: http://www.rolltronics.com/roll2roll.htm.
Veronis, Georgios and Inan, Umran S., "Optimization of the Luminous Efficiency of Plasma Display Panels Using Numerical Modeling" [online], [retrieved on Mar. 13, 2002], 8 pp., Retrieved from the Internet: http://www.star.stanford.edu/~vlf/plasma _display/index.htm.
Smilgys, Russell, et al., "Progress Toward Roll Processing of Solar Reflective Material," *Proceedings of Solar Forum 2001 Solar Energy: The Power to Choose,* Washington DC, 8 pp., Apr. 21-25, 2001.
Srinivasan, Uthara, et al., "Microstructure to Substrate Self-Assembly Using Capillary Forces," *Nournal of Microelectromechanical Systems,* vol. 10, No. 1, Mar., 2001, pp. 17-17-24.
Chutinan, Alongkarn and Noda, Susumu, "Waveguides and Waveguide Bends in Two-Dimensional Photonic Crystal Slabs," *The American Physical Society,* vol. 62, No. 7, 5 pp., Aug. 15, 2000.
"Rolltronics" [online], Feb. 20, 2000 [retrieved on Mar. 12, 2000], 13 pp., Retrieved from the Internet: http://www.rolltronics.com.
"Electronics & Telecommunications" [online], LG Electronics, Copyright 2001 [retrieved on Nov. 7, 2001], 1 p., Retrieved from the Internet: http://www.lg.co.kr/English/company/electronic/index.jsp?code=A3.
"New Product" [online], LG Electronics, Copyright 2001 [retrieved on Nov. 7, 2001], 1 p., Retrieved from the Internet: http://www.lge.com.
"Monitor" [online], LG Electronics, Copyright 2001 [retrieved on Nov. 7, 2001], 2 pp., Retrieved from the Internet: http://www.lgeus.com/Product/Monitor/newmonitors.asp.
"LG Electronics Introduces 42-Inch Digital PDP TV" [online], LG Electronics, Copyright 2001 [retrieved on Nov. 7, 2001], 2 pp., Retrieved from the Internet: http://www.pdpdisplay.com/eng/news/e_read.as?nSeqno=22.
"LG PDP Now Available at World Renowned Harrods Department Store"[online], LG Electronics, Copyright 2001 [retrieved on Nov. 7, 2001], 2 pp., Retrieved from the Internet: http://www.pdpdisplay.com/eng/news/e_read.asp?nSeqno21.
"LG Electronics Becomes First in Korea to Export PDP Module" [online], LG Electronics, Copyright 2001 [retrieved on Nov. 7, 2001], 2 pp., Retrieved from the Internet: http://www.pdpdisplay.com/eng/news/e_read.asp?nSeqNo=19&type=&word=.
"LG Electronics —To the Top in PDP Business" [online], LG Electronics, Copyright 2001 [retrieved on Nov. 7, 2001], 2 pp., Retrieved from the Internet: http://www.pdpdisplay.com/eng/news/e_read.asp?nSeqNo=16&type=&word=.
"LG Electronics Becomes the First in Korea to Export PDP" [online], LG Electronics, Copyright 2001 [retrieved on Nov. 7, 2001], 2 pp., Retrieved from the Internet: http://www.pdpdisplay.com/eng/news/e_read.asp?nSeqNo=14&type=&word=.
"LG Electronics Held the Ceremony for the Completion of the PDP Factory" [online], LG Electronics, Copyright 2001 [retrieved on Nov. 7, 2001], 2 pp., Retrieved from the Internet: http://www.pdpdisplay.com/eng/news/e_read.asp?nSeqNo=13&type=&word.
"Runco PlasmaWall Systems with Vivex Processing" [online], Copyright 2001 [retrieved on Jan. 17, 2002], 2 pp., Retrieved from the Internet: http://www.runco.com/Products/Plasma/Default.htm.
"Runco PlasmaWall PL-42cx" [online], Copyright 2001 [retrieved on Jan. 17, 2002], 2 pp., Retrieved from the Internet: http://www.runco.com/Products/Plasma/PL42cx.htm.
"Runco PlasmaWall Pl-50c" [online], Copyright 2001 [retrieved on Jan. 17, 2002], 2 pp., Retrieved from the Internet: http://www.runco.com/Products/Plasma/PL50c.htm.
"Runco PlasmaWall™ PL-61cx" [online], Copyright 2001 [retrieved on Jan. 17, 2002], 2 pp., Retrieved from the Internet: http://www.runco.com/Products/Plasma/PL61.htm.
Alien Technology Corporation's Technology Overview; copyright© 2000, Alien Technology™; http://www.alientechnology.com/d/technology/overview.html.
Anonymous, *Alien Technology Corporation White Paper—Fluidic Self Assembly,* Alien Technology Corp., Oct. 1999, pp. 1-7.
Shin, Y.K., Lee, J. K., Shon, C. H., "Two-Dimensional Breakdown Characteristics of PDP Cells for Varying Geometry" , *IEEE Transactions on Plasma Science*, vol. 27, No. 1, Feb., 1999, pp. 14-15.
Raulf, S., Kushner, M. J., "Operation of a Coplanar-Electrode Plasma Display Panel Cell" , *IEEE Transactions on Plasma Science*, vol. 27, No. 1, Feb. 1999, pp. 10-11.
Kurihara, M., Makabe, T., "Two-Dimensional Modeling of a Micro-Cell Plasma in Xe Driven by High Frequency" , *IEEE Transactions on Plasma Science*, vol. 27, No. 5, Oct. 1999, pp. 1372-1378.
Peterson, "Rethinking Ink" [online], Science News, vol. 153, No. 25, Jun. 20, 1998 [retrieved on Dec. 4, 2002], 7 pp., Retrieved from the Internet: http://www.sciencenews.org/sn_arc98/6_20_98/bob2.htm.
"Transparent Conductive Coatings" , Copyright 1998, 4 pp.
Lin, Yi-Zhen, et al., "A New Method of Analyzing the Light Transmission in Leaky and Absorbing Planar Waveguides" , *IEEE Photonics Technology Letters*, vol. 9, No. 9, Sep. 1997, pp. 1241.
Jacobson, et al., "The Last Book" [online], IBM Systems Journal, vol. 36, No. 3, 1997 [retrieved on Dec. 4, 2002], 6 pp., Retrieved from the Internet: http://www.research.ibm.com/journal/sj/363/Jacobson.html.
Stearns, Thomas H., "Flexible Printed Circuitry" , 6 pp., 1996.
"Flat Panel Displays in Perspective" , 44 pp., Sep., 1995.
Franjione, et al., "The Art and Science of Microencapsulation" [online]Technology Today, Summer, 1995 [retrieved on Dec. 4, 2002], 10 pp., Retrieved from the Internet: http://www.swri.edu/3pubs/ttoday/summer95/microeng.htm.
Preliminary Examination Report for Application No. PCT/US01/42803, dated Sep. 22, 2003 (mailing date).

* cited by examiner

SOCKET FOR USE WITH A MICRO-COMPONENT IN A LIGHT-EMITTING PANEL

CROSS-REFERENCE TO RELATED APPLICATIONS

The current application is a divisional application of U.S. patent application Ser. No. 10/643,608 filed Aug. 20, 2003 now U.S. Pat. No. 6,902,456, which is a continuation application of U.S. patent application Ser. No. 10/318,150, filed Dec. 13, 2002 now U.S. Pat. No. 6,646,388 and titled Socket for Use with a Micro-Component in a Light-Emitting Panel which is a continuation of Ser. No. 09/697,346 similarly titled U.S. Pat. No. 6,545,422 filed Oct. 27, 2000. The following applications filed on the same date as the present application are herein incorporated by reference: U.S. patent application Ser. No. 09/697,358 entitled A Micro-Component for Use in a Light-Emitting Panel filed Oct. 27, 2000; U.S. patent application Ser. No. 09/697,498 entitled A Method for Testing a Light-Emitting Panel and the Components Therein filed Oct. 27, 2000; U.S. patent application Ser. No. 09/697,345 entitled A Method and System for Energizing a Micro-Component In a Light-Emitting Panel filed Oct. 27, 2000; and U.S. patent application Ser. No. 09/697,344 entitled A Light-Emitting Panel and a Method of Making filed Oct. 27, 2000.

BACKGROUND OF THE INVENTION

1. Field of the Invention

The present invention relates to a light-emitting panel and methods of fabricating the same. The present invention further relates to a socket, for use in a light-emitting panel, in which a micro-component is at least partially disposed.

2. Description of Related Art

In a typical plasma display, a gas or mixture of gases is enclosed between orthogonally crossed and spaced conductors. The crossed conductors define a matrix of cross over points, arranged as an array of miniature picture elements (pixels), which provide light. At any given pixel, the orthogonally crossed and spaced conductors function as opposed plates of a capacitor, with the enclosed gas serving as a dielectric. When a sufficiently large voltage is applied, the gas at the pixel breaks down creating free electrons that drawn to the positive conductor and; positively charged gas ions that are drawn to the negatively charged conductor. These free electrons and positively charged gas ions collide with other gas atoms causing an avalanche effect creating still more free electrons and positively charged ions, thereby creating plasma. The voltage level at which this ionization occurs is called the write voltage.

Upon application of a write voltage, the gas at the pixel ionizes and emits light only briefly as free charges formed by the ionization migrate to the insulating dielectric walls of the cell where these charges produce an opposing voltage to the applied voltage and thereby extinguish the ionization. Once a pixel has been written, a continuous sequence of light emissions can be produced by an alternating sustain voltage. The amplitude of the sustain waveform can be less than the amplitude of the write voltage, because the wall charges that remain from the preceding write or sustain operation produce a voltage that adds to the voltage of the succeeding sustain waveform applied in the reverse polarity to produce the ionizing voltage. Mathematically, the idea can be set out as $V_s=V_w-V_{wall}$, where $V_s$ is the sustain voltage, $V_w$ is the write voltage, and $V_{wall}$ is the wall voltage. Accordingly, a previously unwritten (or erased) pixel cannot be ionized by the sustain waveform alone. An erase operation can be thought of as a write operation that proceeds only far enough to allow the previously charged cell walls to discharge; it is similar to the write operation except for timing and amplitude.

Typically, there are two different arrangements of conductors that are used to perform the write, erase, and sustain operations. The one common element throughout the arrangements is that the sustain and the address electrodes are spaced apart with the plasma-forming gas in between. Thus, at least one of the address or sustain electrodes is located within the path the radiation travels, when the plasma-forming gas ionizes, as it exits the plasma display. Consequently, transparent or semi-transparent conductive materials must be used, such as indium tin oxide (ITO), so that the electrodes do not interfere with the displayed image from the plasma display. Using ITO, however, has several disadvantages, for example, ITO is expensive and adds significant cost to the manufacturing process and ultimately the final plasma display.

The first arrangement uses two orthogonally crossed conductors, one addressing conductor and one sustaining conductor. In a gas panel of this type, the sustain waveform is applied across all the addressing conductors, and sustain conductors so that the gas panel maintains a previously written pattern of light emitting pixels. For a conventional write operation, a suitable write voltage pulse is added to the sustain voltage waveform so that the combination of the write pulse and the sustain pulse produces ionization. In order to write an individual pixel independently, each of the addressing and sustain conductors has an individual selection circuit. Thus, applying a sustain waveform across all the addressing and sustain conductors, but applying a write pulse across only one addressing and one sustain conductor will produce a write operation in only the one pixel at the intersection of the selected addressing and sustain conductors.

The second arrangement uses three conductors. In panels of this type, called coplanar sustaining panels, each pixel is formed at the intersection of three conductors, one addressing conductor and two parallel sustaining conductors. In this arrangement, the addressing conductor orthogonally crosses the two parallel sustaining conductors. With this type of panel, the sustain function is performed between the two parallel sustaining conductors and the addressing is done by the generation of discharges between the addressing conductor and one of the two parallel sustaining conductors.

The sustaining conductors are of two types, addressing-sustaining conductors and solely sustaining conductors. The function of the addressing-sustaining conductors is twofold: to achieve a sustaining discharge in cooperation with the solely sustaining conductors; and to fulfill an addressing role. Consequently, the addressing-sustaining conductors are individually selectable so that an addressing waveform may be applied to any one or more addressing-sustaining conductors. The solely sustaining conductors, on the other hand, are typically connected in such a way that a sustaining waveform can be simultaneously applied to all of the solely sustaining conductors so that they can be carried to the same potential in the same instant.

Numerous types of plasma panel display devices have been constructed with a variety of methods for enclosing a plasma forming gas between sets of electrodes. In one type of plasma display panel, parallel plates of glass with wire electrodes on the surfaces thereof are spaced uniformly apart and sealed together at the outer edges with the plasma forming gas filling the cavity formed between the parallel plates. Although widely used, this type of open display structure has various disadvantages. The sealing of the outer edges of the parallel plates and the introduction of the plasma forming gas are both expensive and time-consuming processes, resulting in a costly end product. In addition, it is particularly difficult to achieve a good seal at the sites where the electrodes are fed through the ends of the parallel plates. This can result in gas leakage and a shortened product lifecycle. Another disadvantage is that individual pixels are not segregated within the parallel plates. As a result, gas ionization activity in a selected pixel during a write operation may spill over to adjacent pixels, thereby raising the undesirable prospect of possibly igniting adjacent pixels. Even if adjacent pixels are not ignited, the ionization activity can change the turn-on and turn-off characteristics of the nearby pixels.

In another type of known plasma display, individual pixels are mechanically isolated either by forming trenches in one of the parallel plates or-by adding a perforated insulating layer sandwiched between the parallel plates. These mechanically isolated pixels, however, are not completely enclosed or isolated from one another because there is a need for the free passage of the plasma forming gas between the pixels to assure uniform gas pressure throughout the panel. While this type of display structure decreases spill over, spill over is still possible because the pixels are not in total electrical isolation from one another. In addition, in this type of display panel it is difficult to properly align the electrodes and the gas chambers, which may cause pixels to misfire. As with the open display structure, it is also difficult to get a good seal at the plate edges. Furthermore, it is expensive and time consuming to introduce the plasma producing gas and seal the outer edges of the parallel plates.

In yet another type of known plasma display, individual pixels are also mechanically isolated between parallel plates. In this type of display, the plasma forming gas is contained in transparent spheres formed of a closed transparent shell. Various methods have been used to contain the gas filled spheres between the parallel plates. In one method, spheres of varying sizes are tightly bunched and randomly distributed throughout a single layer, and sandwiched between the parallel plates. In a second method, spheres are embedded in a sheet of transparent dielectric material and that material is then sandwiched between the parallel plates. In a third method, a perforated sheet of electrically nonconductive material is sandwiched between the parallel plates with the gas filled spheres distributed in the perforations.

While each of the types of displays discussed above are biased on different design concepts, the manufacturing approach used in their fabrication is generally the same. Conventionally, a batch fabrication process is used to manufacture these types of plasma panels. As is well known in the art, in a batch process individual component parts are fabricated separately, often in different facilities and by different manufacturers, and then brought together for final assembly where individual plasma panels are created one at a time. Batch processing has numerous shortcomings, such as, for example, the length of time necessary to produce a finished product. Long cycle times increase product cost and are undesirable for numerous additional reasons known in the art. For example, a sizeable quantity of substandard, defective, or useless fully or partially completed plasma panels may be produced during the period between detection of a defect or failure in one of the components and an effective correction of the defect or failure.

This is especially true of the first two types of displays discussed above; the first having no mechanical isolation of individual pixels, and the second with individual pixels mechanically isolated either by trenches formed in one parallel plate or by a perforated insulating layer sandwiched between two parallel plates. Due to the fact that plasma-forming gas is not isolated at the individual pixel/subpixel level, the fabrication process precludes the majority of individual component parts from being tested until the final display is assembled. Consequently, the display can only be tested after the two parallel plates are sealed together and the plasma-forming gas is filled inside the cavity between the two plates. If post production testing shows that any number of potential problems have occurred, (e.g. poor luminescence or no luminescence at specific pixel/subpixels) the entire display is discarded.

BRIEF SUMMARY OF THE INVENTION

Preferred embodiments of the present invention provide a light-emitting panel that may be used as a large-area radiation source, for energy modulation, for particle detection and as a flat-panel display. Gas-plasma panels are preferred for these applications due to their unique characteristics.

In one basic form, the light-emitting panel may be used as a large area radiation source. By configuring the light-emitting panel to emit ultraviolet (UV) light; the panel has application for curing, painting, and sterilization. With the addition of a white phosphor coating to convert the UV light to visible white light, the panel also has application as an illumination source.

In addition, the light-emitting panel may be used as a plasma-switched phase army by configuring the panel in at least one embodiment in a microwave transmission mode. The panel is configured in such a way that during ionization the plasma-forming gas creates a localized index of refraction change for the microwaves (although other wavelengths of light would work). The microwave beam from the panel can then be steered or directed in any desirable pattern by introducing at a localized area a phase shift and/or directing the microwaves out of a specific aperture in the panel Additionally, the light-emitting panel may be used for particle/photon detection. In this embodiment, the light-emitting panel is subjected to a potential that is just slightly below the write voltage required for ionization. When the device is subjected to outside energy at a specific position or location in the panel, that additional energy causes the plasma forming gas in the specific area to ionize, thereby providing a means of detecting outside energy.

Further, the light-emitting panel may be used in flat-panel displays. These displays can be manufactured very thin and lightweight, when compared to similar sized cathode ray tube (CRTs), making them ideally suited for home, office, theaters and billboards. In addition, these displays can be manufactured in large sizes and with sufficient resolution to accommodate high-definition television (HDTV). Gas-plasma panels do not suffer from electromagnetic distortions and are, therefore, suitable for applications strongly affected by magnetic fields, such as military applications, radar systems, railway stations and other underground systems.

According to a general embodiment of the present invention, a light-emitting panel is made from two substrates, wherein one of the substrates includes a plurality of sockets and wherein at least two electrodes are disposed. At least partially disposed in each socket is a micro-component, although more than one micro-component may be disposed therein. Each micro-component includes a shell at least partially filled with a gas or gas mixture capable of ionization. When a large enough voltage is applied across the micro-component the gas or gas mixture ionizes forming plasma and emitting radiation. Various embodiments of the present invention are drawn to different socket structures.

In one embodiment of the present invention a cavity is patterned on a substrate such that it is formed in the substrate. In another embodiment, a plurality of material layers form a substrate and a portion of the material layers is selectively removed to form a cavity. In another embodiment, a cavity is patterned on a substrate so that the cavity is formed in the substrate and a plurality of material layers are disposed on the substrate such that the material layers conform to the shape of the cavity. In another embodiment, a plurality of material layers, each including an aperture, are disposed on a substrate. In this embodiment, the material layers are disposed so that the apertures are aligned, thereby forming a cavity. Other embodiments are directed to methods for forming the sockets described above.

Each socket includes at least two electrodes that are arranged so voltage applied to the two electrodes causes one or more micro-components to emit radiation. In an embodiment of the present invention, the at least two electrodes are adhered to only the first substrate, only the second substrate, or at least one electrode is adhered to the first substrate and at least one electrode is adhered to the second substrate. In another embodiment, the at least two electrodes are arranged so that the radiation emitted from the micro-component when energized is emitted throughout the field of view of the light-emitting panel such that the radiation does not cross the two electrodes. In another embodiment, at least one electrode is disposed within the material layers.

A cavity can be any shape or size. In an embodiment, the shape of the cavity is selected from a group consisting of a cube, a cone, a conical frustum, a paraboloid, spherical, cylindrical, a pyramid, a pyramidal frustum, a parallelepiped, and a prism. In another embodiment, a socket and a micro-component are described with a male-female connector type configuration. In this embodiment, the micro-component and the cavity have complimentary shapes, wherein the opening of the cavity is smaller than the diameter of the micro-component so that when the micro-component is disposed in the cavity the micro-component is held in place by the cavity.

The size and shape of the socket influences the performance and characteristics of the display and may be chosen, for example, to optimize the panel's efficiency of operation. In addition, the size and shape of the socket may be chosen to optimize photon generation and provide increased luminosity and radiation transport efficiency. Further, socket geometry may be selected based on the shape and size of the micro-component to optimize the surface contact between the micro-component and the socket and/or to ensure connectivity of the micro-component and any electrodes disposed within the socket. In an embodiment, the inside of a socket is coated with a reflective material, which provides an increase in luminosity.

Other features, advantages, and embodiments of the invention are set forth in part in the description that follows, and in part, will be obvious from this description, or may be learned from the practice of the invention.

BRIEF DESCRIPTION OF THE DRAWINGS

The foregoing and other features and advantages of this invention will become more apparent by reference to the following detailed description of the invention taken in conjunction with the accompanying drawings.

DETAILED DESCRIPTION OF THE PREFERRED EMBODIMENTS OF THE INVENTION

As embodied and broadly described herein, the preferred embodiments of the present invention are directed to a novel light-emitting panel. In particular, the preferred embodiments are directed to a socket capable of being used in the light-emitting panel and supporting at least one micro-component.

Figure 1:
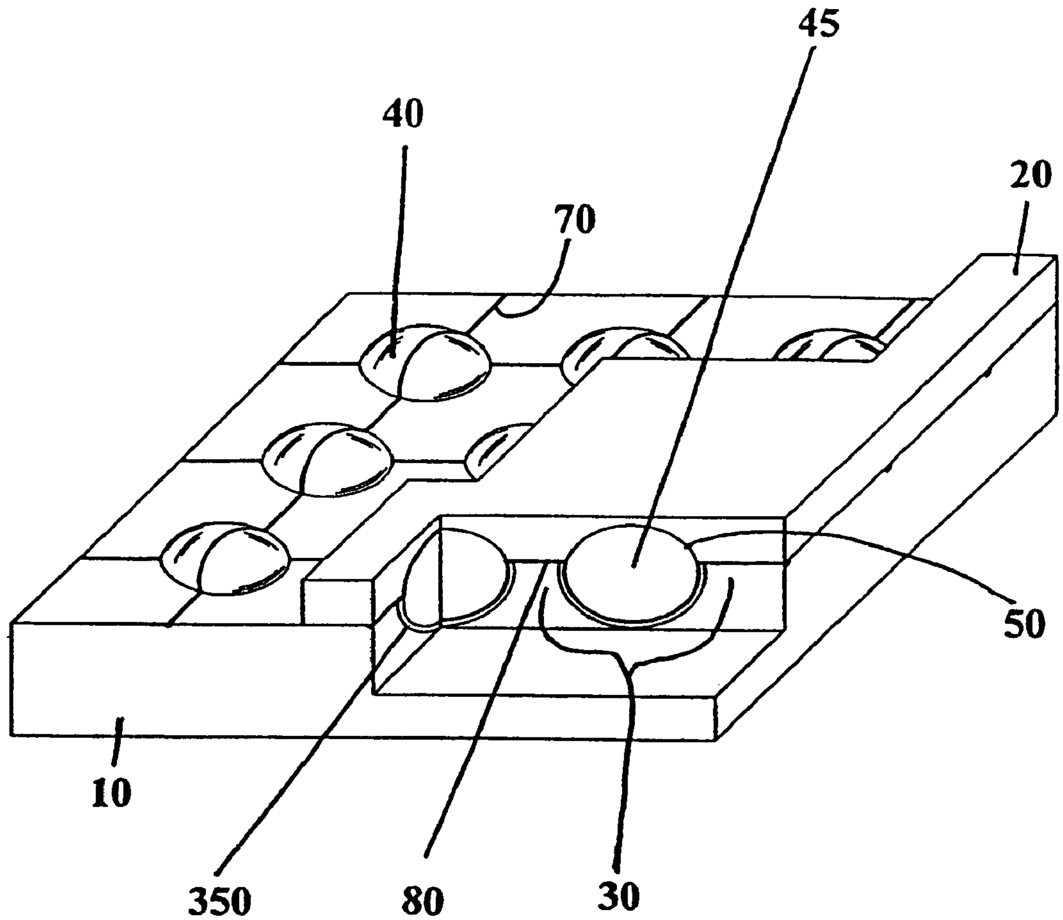
FIG. 1 depicts a portion of a light-emitting panel showing the basic socket structure of a socket formed from patterning a substrate, as disclosed in an embodiment of the present invention.
Figure 2:
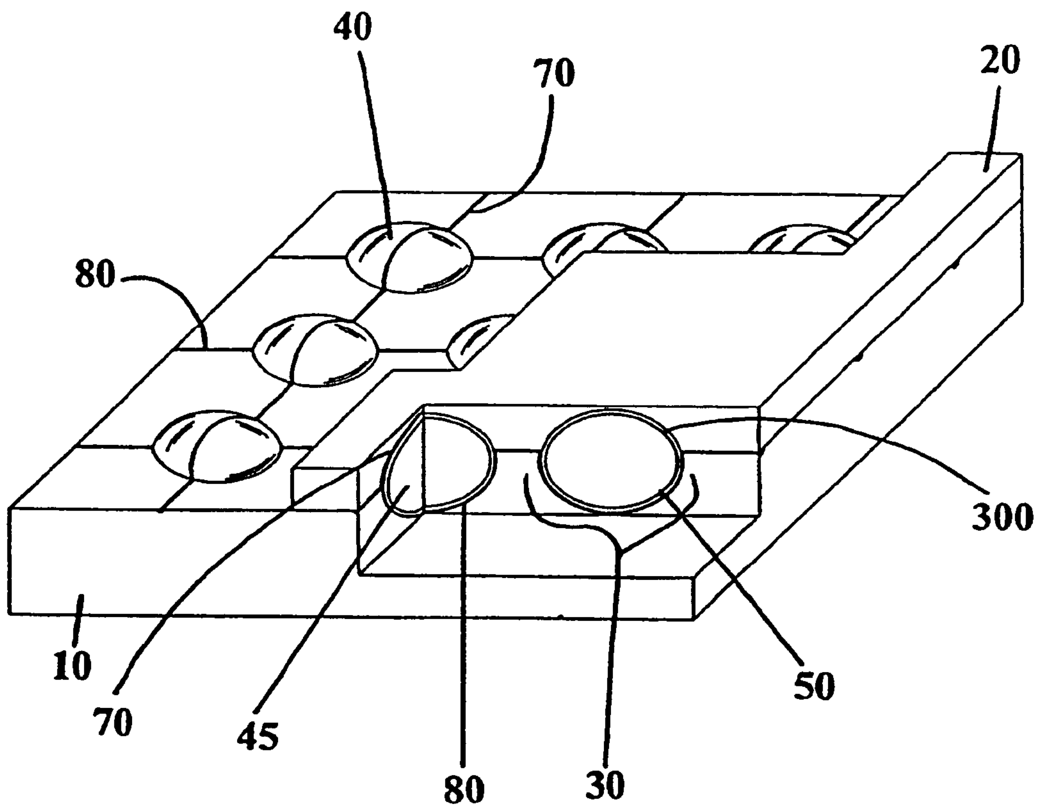
FIG. 2 depicts a portion of a light-emitting panel showing the basic socket structure of a socket formed from patterning a substrate, as disclosed in another embodiment of the present invention.
Figure 3:
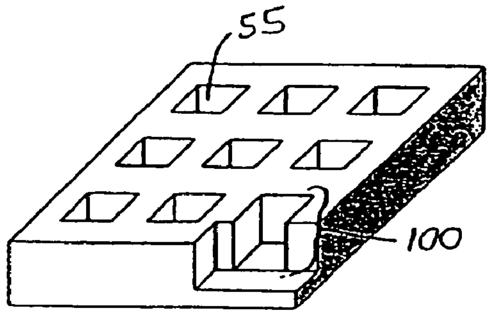
FIG. 3A shows an example of a cavity that has a cube shape.
FIG. 3B shows an example of a cavity that has a cone shape.
FIG. 3C shows an example of a cavity that has a conical frustum shape.
FIG. 3D shows an example of a cavity that has a paraboloid shape.
FIG. 3E shows an example of a cavity that has a spherical shape.
FIG. 3F shows an example of a cavity that has a cylindrical shape.
FIG. 3G shows an example of a cavity that has a pyramid shape.
FIG. 3H shows an example of a cavity that has a pyramidal frustum shape.
FIG. 3I shows an example of a cavity that has a parallelepiped shape.
FIG. 3J shows an example of a cavity that has a prism shape.
Figure 3:
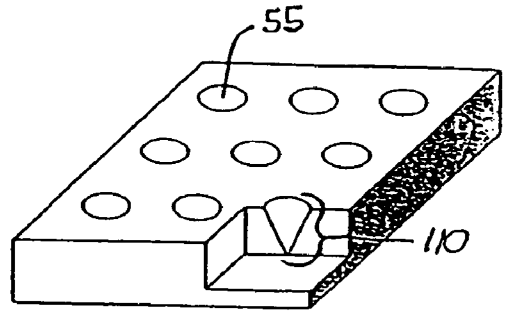
Figure 3C:
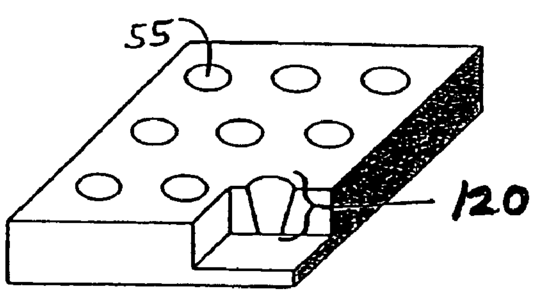
Figure 3:
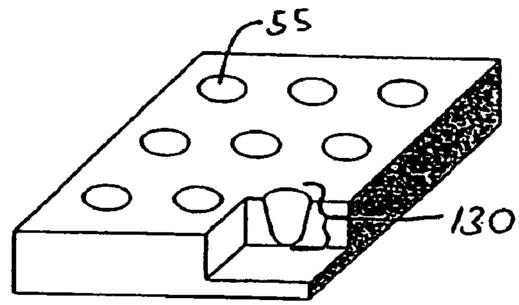
Figure 3E:
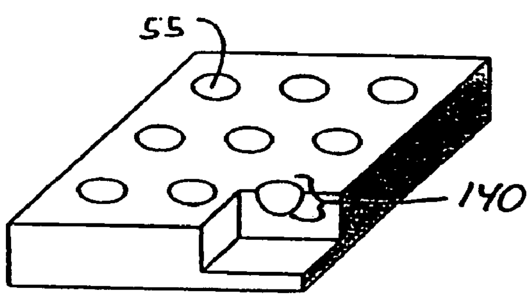
Figure 3F:
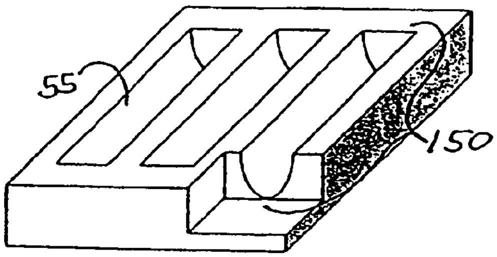
Figure 3G:
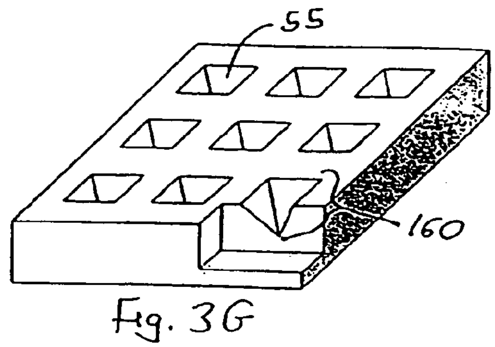
Figure 3H:
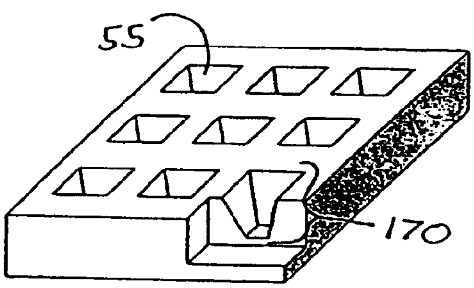
Figure 3I:
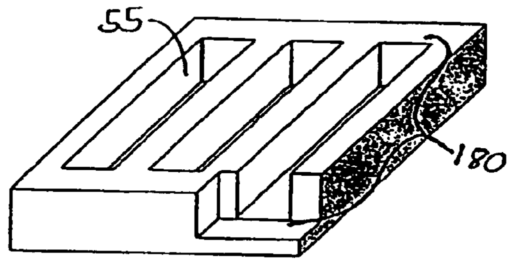
Figure 3J:
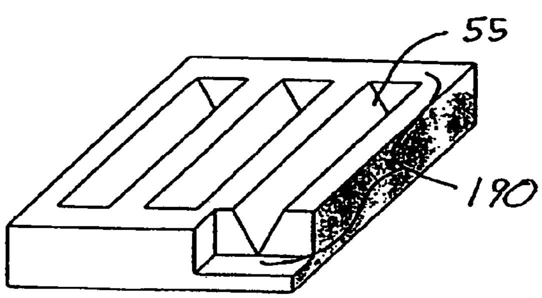

FIGS. 1 and 2 show two embodiments of the present invention wherein a light-emitting panel includes a first substrate 10 and a second substrate 20. The first substrate 10 may be made from silicates, polypropylene, quartz, glass, any polymeric-based material or any material or combination of materials known to one skilled in the art. Similarly, second substrate 20 may be made from silicates, polypropylene, quartz, glass, any polymeric-based material or any material or combination of materials known to one skilled in the art. First substrate 10 and second substrate 20 may both be made from the same material or each of a different material. Additionally, the first and second substrate may be made of a material that dissipates heat from the light-emitting panel. In a preferred embodiment, each substrate is made from a material that is mechanically flexible.

The first substrate 10 includes a plurality of sockets 30. The sockets 30 may be disposed in any pattern, having uniform or non-uniform spacing between adjacent sockets. Patterns may include, but are not limited to, alphanumeric characters, symbols, icons, or pictures. Preferably, the sockets 30 are disposed in the first substrate 10 so that the distance between adjacent sockets 30 is approximately equal. Sockets 30 may also be disposed in groups such that the distance between one group of sockets and another group of sockets is approximately equal. This latter approach may be particularly relevant in color light-emitting panels, where each socket in each group of sockets may represent red, green and blue, respectively.

At least partially disposed in each socket 30 is at least one micro-component 40. Multiple micro-components 40 may be disposed in a socket to provide increased luminosity and enhanced radiation transport efficiency. In a color light-emitting panel according to one embodiment of the present invention, a single socket supports three micro-components configured to emit red, green, and blue light, respectively. The micro-components 40 may be of any shape, including, but not limited to, spherical, cylindrical, and aspherical. In addition, it is contemplated that a micro-component 40 includes a micro-component placed or formed inside another structure, such as placing a spherical micro-component inside a cylindrical-shaped structure. In a color light-emitting panel, each cylindrical-shaped structure may hold micro-components configured to emit a single color of visible light or multiple colors arranged red, green, blue, or in some other suitable color arrangement.

In its most basic form, each micro-component 40 includes a shell 50 filled with a plasma-forming gas or gas mixture 45. While a plasma-forming gas or gas mixture 45 is used in a preferred embodiment, any other material capable of providing luminescence is also contemplated, such as an electro-luminescent material, organic light-emitting diodes (OLEDs), or an electro-phoretic material. The shell 50 may have a diameter ranging from micrometers to centimeters as measured across its minor axis, with virtually no limitation as to its size as measured across its major axis. For example, a cylindrical-shaped micro-component may be only 100 microns in diameter across its minor axis, but may be hundreds of meters long across its major axis. In a preferred embodiment, the outside diameter of the shell, as measured across its minor axis, is from 100 microns to 300 microns. When a sufficiently large voltage is applied across the micro-component the gas or gas mixture ionizes forming plasma and emitting radiation.

Figure 12:
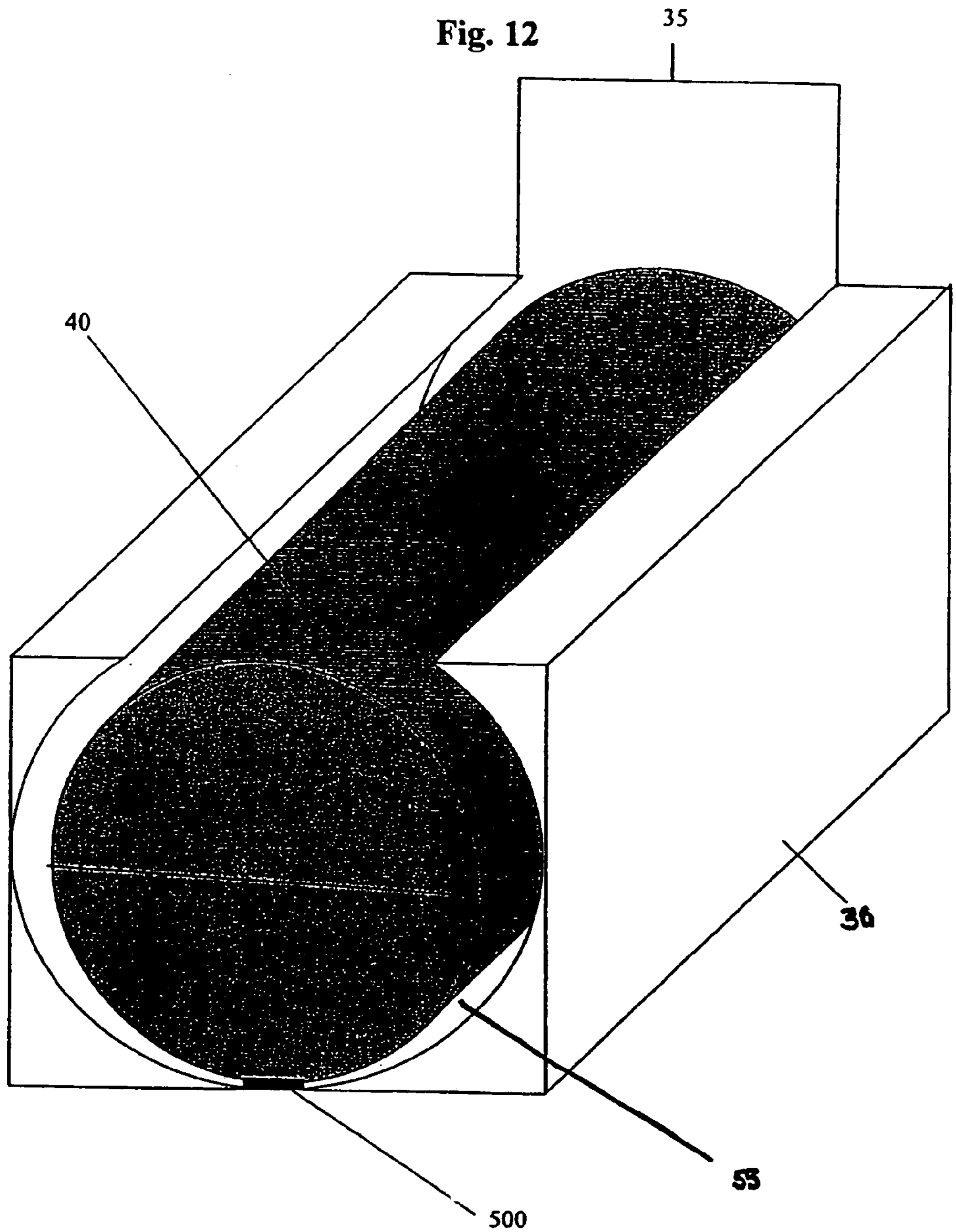
FIG. 12 shows a portion of a socket of an embodiment of the present invention where the micro-component and the cavity are formed as a type of male-female connector.

A cavity 55 formed within and/or on a substrate provides the basic socket 30 structure. The cavity 55 may be any shape and size. As depicted in FIGS. 3A–3J, the shape of the cavity 55 may include, but is not limited to, a cube 100, a cone 110, a conical frustum 120, a paraboloid 130, spherical 140, cylindrical 150, a pyramid 160, a pyramidal frustum 170, a parallelepiped 180, or a prism 190. In addition, in another embodiment of the present invention as shown in FIG. 12, the socket 30 may be formed as a type of male-female connector with a male micro-component 40 and a female cavity 55. The male micro-component 40 and female cavity 55 are formed to have complimentary shapes. As shown in FIG. 12, as an example, both the cavity and micro-component have complimentary cylindrical shapes. The opening 35 of the female cavity is formed such that the opening is smaller than the diameter d of the male micro-component. The larger diameter male micro-component can be forced through the smaller opening of the female cavity 55 so that the male micro-component 40 is lockedlheld in the cavity and automatically aligned in the socket with respect to at least one electrode 500 disposed therein. This arrangement provides an added degree of flexibility for micro-component placement. In another embodiment, this socket structure provides a means by which cylindrical micro-components may be fed through the sockets on a row-by-row basis or in the case of a single long cylindrical micro-component (although other shapes would work equally well) fed/woven throughout the entire light-emitting panel.

The size and shape of the socket 30 influences the performance and characteristics of the light-emitting panel and are selected to optimize the panel's efficiency of operation. In addition, socket geometry may be selected based on the shape and size of the micro-component to optimize the surface contact between the micro-component and the socket and/or to ensure connectivity of the micro-component and the electrodes disposed on or within the socket. Further, the size and shape of the sockets 30 may be chosen to optimize photon generation and provide increased luminosity and radiation transport efficiency.

Figure 4:
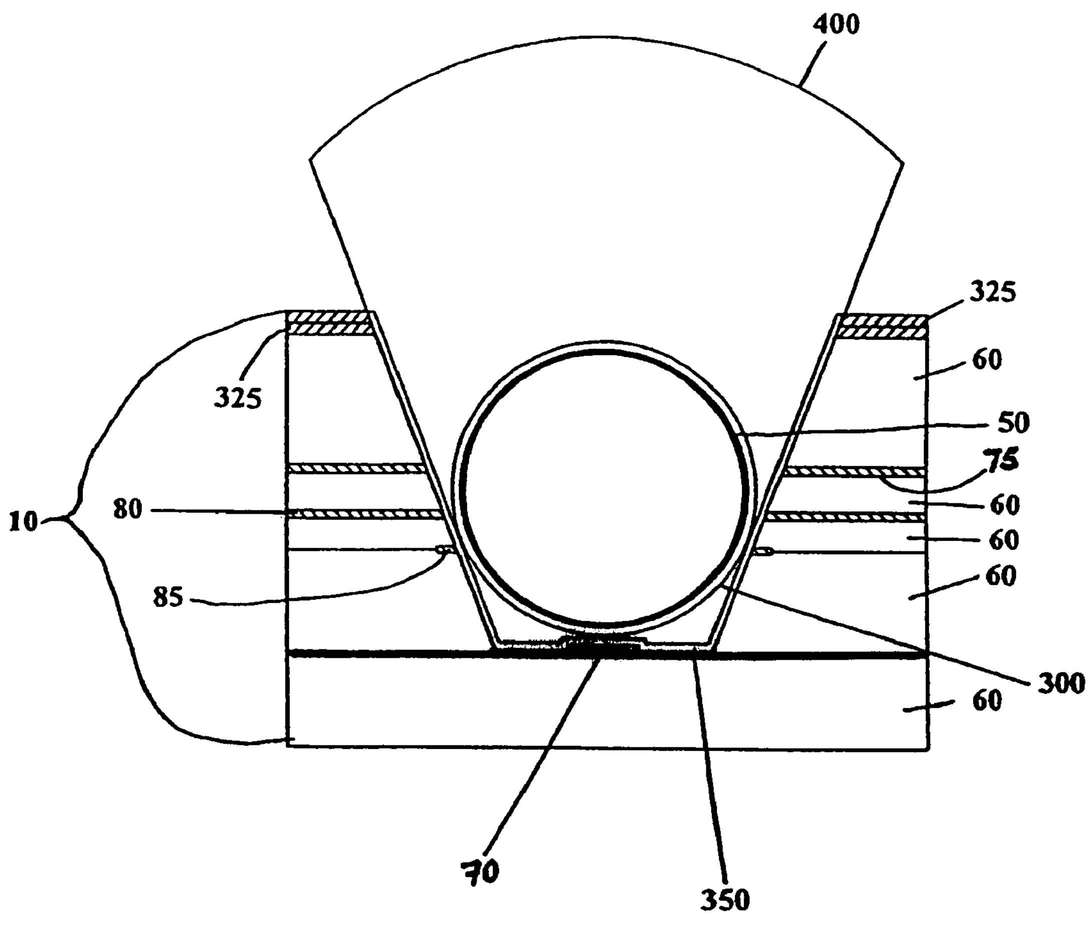
FIG. 4 shows the socket structure from a light-emitting panel of an embodiment of the present invention with a narrower field of view.
Figure 5:
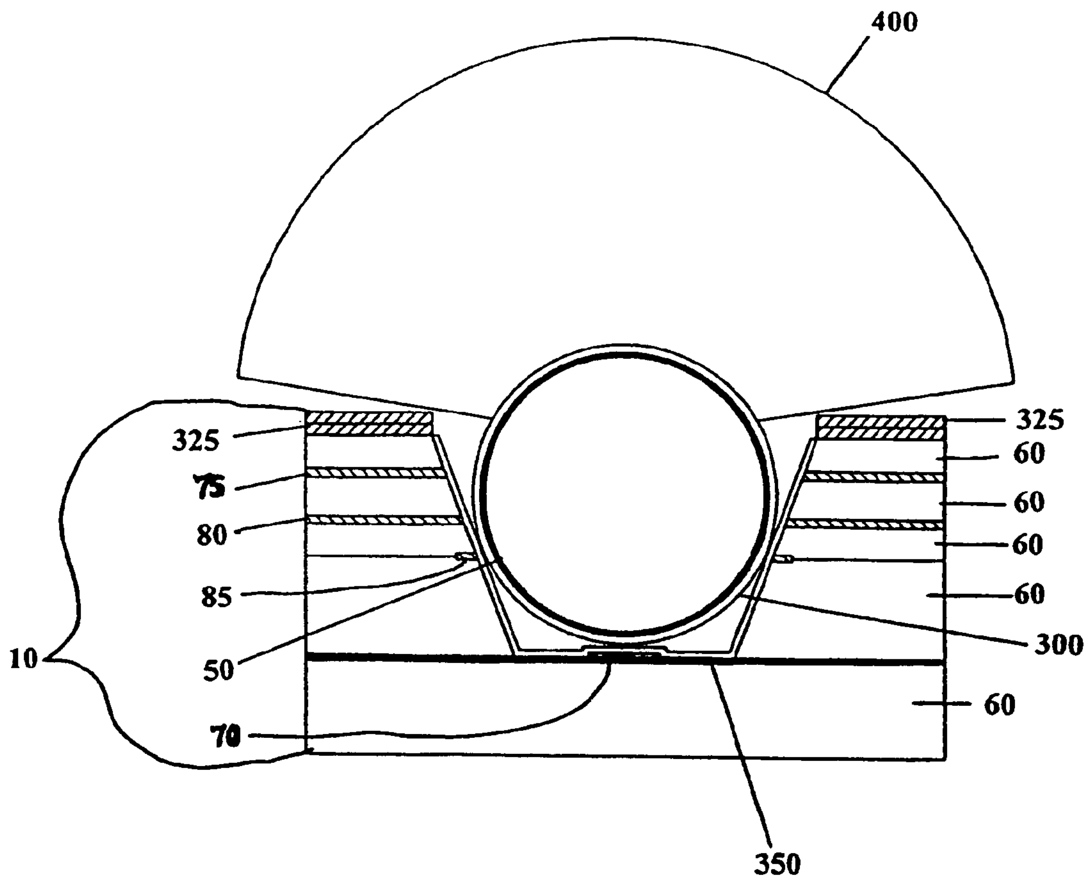
FIG. 5 shows the socket structure from a light-emitting panel of an embodiment of the present invention with a wider field of view.

As shown by example in FIGS. 4 and 5, the size and shape may be chosen to provide a field of view 400 with a specific angle θ, such that a micro-component 40 disposed in a deep socket 30 may provide more collimated light and hence a narrower viewing angle θ (FIG. 4), while a micro-component 40 disposed in a shallow socket 30 may provide a wider viewing angle θ (FIG. 5). That is to say, the cavity may be sized, for example, so that its depth subsumes a micro-component that is deposited within a socket, or it may be made shallow so that a micro-component is only partially disposed within a socket.

There are a variety of coatings 350 that may be at least partially added to a socket that also influence the performance and characteristics of the light-emitting panel. Types of coatings 350 include, but are not limited to, adhesives, bonding agents, coatings used to convert UV light to visible light, coatings used as reflecting filters, and coatings used as band-gap filters. One skilled in the art will recognize that other coatings may also be used. The coatings 350 may be applied to the inside of the socket 30 by differential stripping, lithographic process sputtering, laser deposition, chemical deposition, vapor deposition, or deposition using ink jet technology. One skilled in the art will realize that other methods of coating the inside of the socket 30 may be used. Alternatively, or in conjunction with the variety of socket coatings 350, a micro-component 40 may also be coated with a variety of coatings 300. These micro-component coatings 300 include, but are not limited to, coatings used to convert UV light to visible light, coatings used as reflecting filters, and coatings used as band-gap filters.

In order to assist placing/holding a micro-component 40 or plurality of micro-components in a socket 30, a socket 30 may contain a bonding agent or an adhesive. The bonding agent or adhesive may readily hold a micro-component or plurality of micro-components in a socket or may require additional activation energy to secure the micro-components or plurality of micro-components in a socket. In an embodiment of the present invention, where the micro-component is configured to emit UV light, the inside of each of the sockets 30 is at least partially coated with phosphor in order to convert the UV light to visible light. In a color light-emitting panel, in accordance with another embodiment, red, green, and blue phosphors are used to create alternating red, green, and blue, pixels/subpixels, respectively. By combining these colors at varying intensities all colors can be formed. In another embodiment, the phosphor coating may be combined with an adhesive so that the adhesive acts as a binder for the phosphor and also binds the micro-component 40 to the socket 30 when it is cured. In addition, the socket 30 may be coated with a reflective material, including, but not limited to, optical dielectric stacks, to provide an increase in luminosity, by directing radiation traveling in the direction of the substrate in which the sockets are formed out through the field of view 400 of the light-emitting panel.

In an embodiment for a method of making a light-emitting panel including a plurality of sockets, a cavity 55 is formed, or patterned, in a substrate 10 to create a basic socket shape. The cavity may be formed in any suitable shape and size by any combination of physically, mechanically, thermally, electrically, optically, or chemically deforming the substrate. Disposed proximate to, and/or in, each socket may be a variety of enhancement materials 325. The enhancement materials 325 include, but are not limited to, anti-glare coatings, touch sensitive surfaces, contrast enhancement coatings, protective coatings, transistors, integrated-circuits, semiconductor devices, inductors, capacitors, resistors, diodes, control electronics, drive electronics, pulse-forming networks, pulse compressors, pulse transformers, and tuned-circuits.

In another embodiment of the present invention for a method of making a light-emitting panel including a plurality of sockets, a socket 30 is formed by disposing a plurality of material layers 60 to form a first substrate 10, disposing at least one electrode either directly on the first substrate 10, within the material layers or any combination thereof, and selectively removing a portion of the material layers 60 to create a cavity. The material layers 60 include any combination, in whole or in part, of dielectric materials, metals, and enhancement materials 325. The enhancement materials 325 include, but are not limited to, anti-glare coatings, touch sensitive surfaces, contrast enhancement coatings, protective coatings, transistors, integrated-circuits, semiconductor devices, inductors, capacitors, resistors, diodes, control electronics, drive electronics, pulse-forming networks, pulse compressors, pulse transformers, and tuned-circuits. The placement of the material layers 60 may be accomplished by any transfer process, photolithography, sputtering, laser deposition, chemical deposition, vapor deposition, or deposition using ink jet technology. One of general skill in the art will recognize other appropriate methods of disposing a plurality of material layers on a substrate. The cavity 55 may be formed in the material layers 60 by a variety of methods including, but not limited to, wet or dry etching, photolithography, laser heat treatment, thermal form, mechanical punch, embossing, stamping-out, drilling, electroforming or by dimpling.

In another embodiment of the present invention for a method of making a light-emitting panel including a plurality of sockets, a socket 30 is formed by patterning a cavity 55 in a first substrate 10, disposing a plurality of material layers 65 on the first substrate 10 so that the material layers 65 conform to the cavity 55, and disposing at least one electrode on the first substrate 10, within the material layers 65, or any combination thereof. The cavity may be formed in any suitable shape and size by any combination of physically, mechanically, thermally, electrically, optically, or chemically deforming the substrate. The material layers 65 include any combination, in whole or in part, of dielectric materials, metals, and enhancement materials 325. The enhancement materials 325 include, but are not limited to, anti-glare coatings, touch sensitive surfaces, contrast enhancement coatings, protective coatings, transistors, integrated-circuits, semiconductor devices, inductors, capacitors, resistors, diodes, control electronics, drive electronics, pulse-forming networks, pulse compressors, pulse transformers, and tuned-circuits. The placement of the material layers 65 may be accomplished by any transfer process, photolithography, sputtering, laser deposition, chemical deposition, vapor deposition, or deposition using ink jet technology. One of general skill in the art will recognize other appropriate methods of disposing a plurality of material layers on a substrate.

In another embodiment of the present invention for a method of making a light-emitting panel including a plurality of sockets, a socket 30 is formed by disposing a plurality of material layers 66 on a first substrate 10 and disposing at least one electrode on the first substrate 10, within the material layers 66, or any combination thereof. Each of the material layers includes a preformed aperture 56 that extends through the entire material layer. The apertures may be of the same size or may be of different sizes. The plurality of material layers 66 are disposed on the first substrate with the apertures in alignment thereby forming a cavity 55. The material layers 66 include any combination, in whole or in part, of dielectric materials, metals, and enhancement materials 325. The enhancement materials 325 include, but are not limited to, anti-glare coatings, touch sensitive surfaces, contrast enhancement coatings, protective coatings, transistors, integrated-circuits, semiconductor devices, inductors, capacitors, resistors, diodes, control electronics, drive electronics, pulse-forming networks, pulse compressors, pulse transformers, and tuned-circuits. The placement of the material layers 66 may be accomplished by any transfer process, photolithography, sputtering, laser deposition, chemical deposition, vapor deposition, or deposition using ink jet technology. One of general skill in the art will recognize other appropriate methods of disposing a plurality of material layers on a substrate.

The electrical potential necessary to energize a micro-component 40 is supplied via at least two electrodes. In a general embodiment of the present invention, a light-emitting panel includes a plurality of electrodes, wherein at least two electrodes are adhered to only the first substrate, only the second substrate or at least one electrode is adhered to each of the first substrate and the second substrate and wherein the electrodes are arranged so that voltage applied to the electrodes causes one or more micro-components to emit radiation. In another general embodiment, a light-emitting panel includes a plurality of electrodes, wherein at least two electrodes are arranged so that voltage supplied to the electrodes cause one or more micro-components to emit radiation throughout the field of view of the light-emitting panel without crossing either of the electrodes.

In an embodiment where the cavities 55 are patterned on the first substrate 10 so that the cavities are formed in the first substrate, at least two electrodes may be disposed on the first substrate 10, the second substrate 20, or any combination thereof. In exemplary embodiments as shown in FIGS. 1 and 2, a sustain electrode 70 is adhered on the second substrate 20 and an address electrode 80 is adhered on the first substrate 10. In a preferred embodiment, at least one electrode adhered to the first substrate 10 is at least partly disposed within the socket (FIGS. 1 and 2).

Figure 6A:
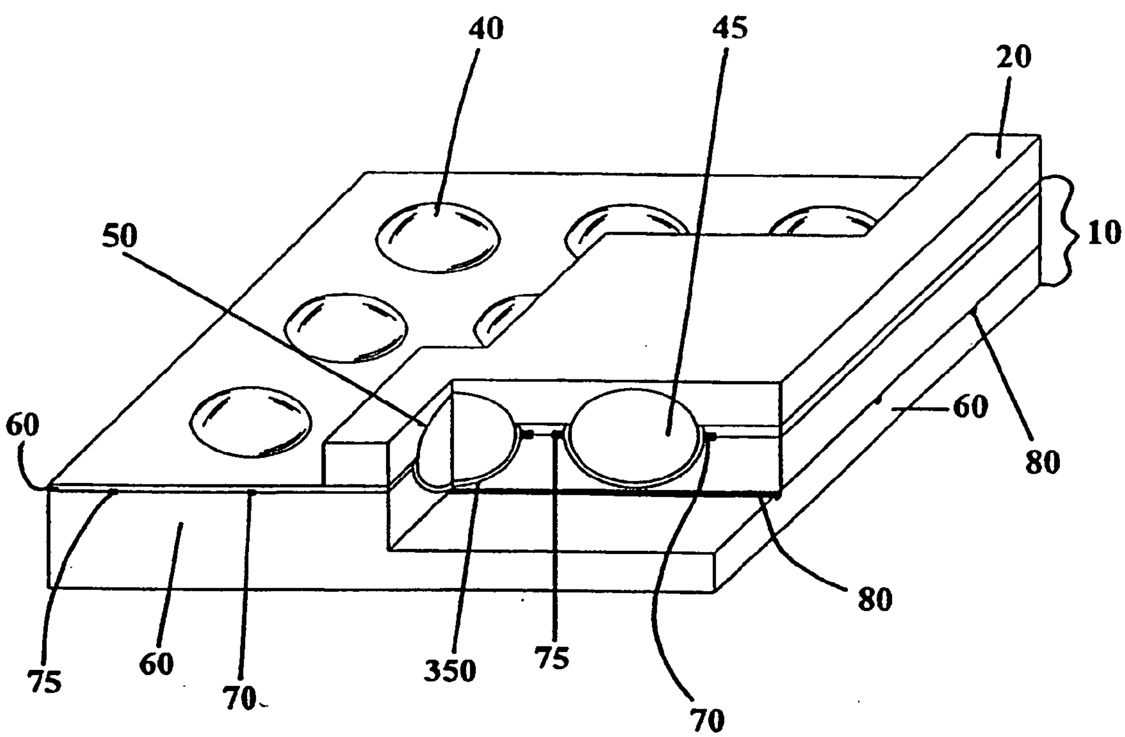
FIG. 6A depicts a portion of a light-emitting panel showing the basic socket structure of a socket formed from disposing a plurality of material layers and then selectively removing a portion of the material layers with the electrodes having a co-planar configuration.
Figure 6B:
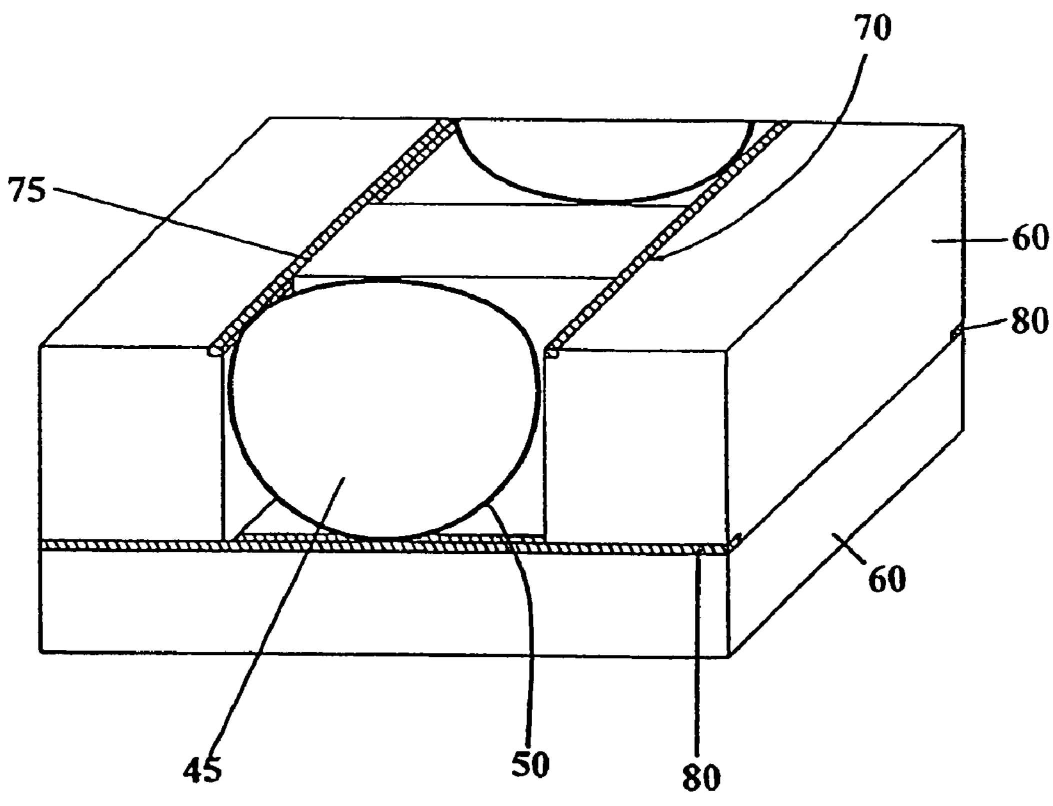
FIG. 6B is a cut-away of FIG. 6A showing in more detail the co-planar sustaining electrodes.
Figure 7A:
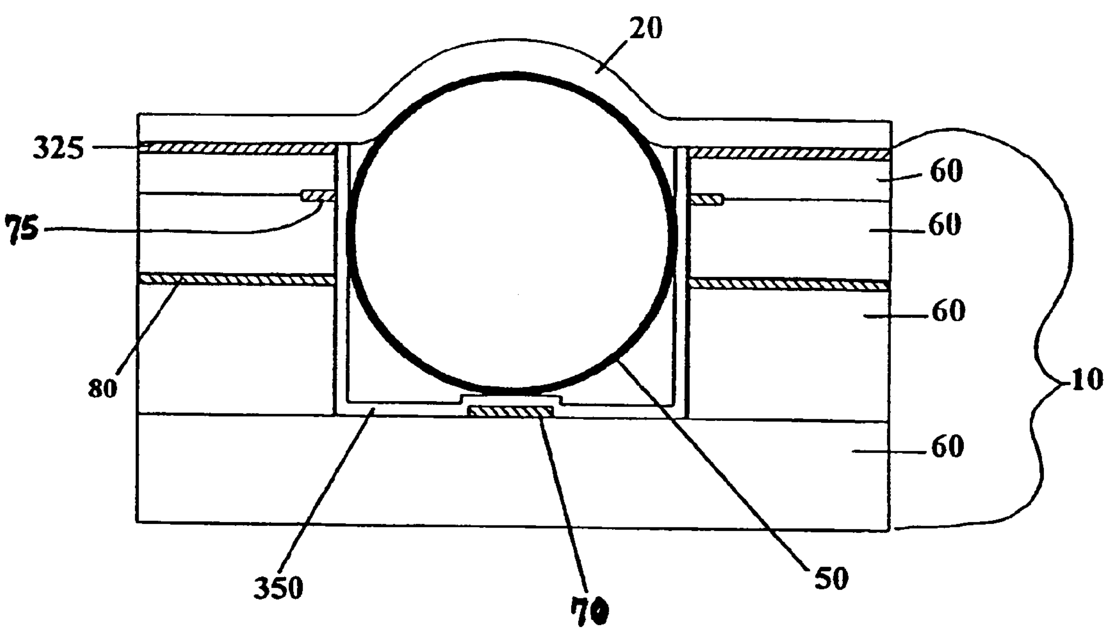
FIG. 7A depicts a portion of a light-emitting panel showing the basic socket structure of a socket formed from disposing a plurality of material layers and then selectively removing a portion of the material layers with the electrodes having a mid-plane configuration.
Figure 7B:
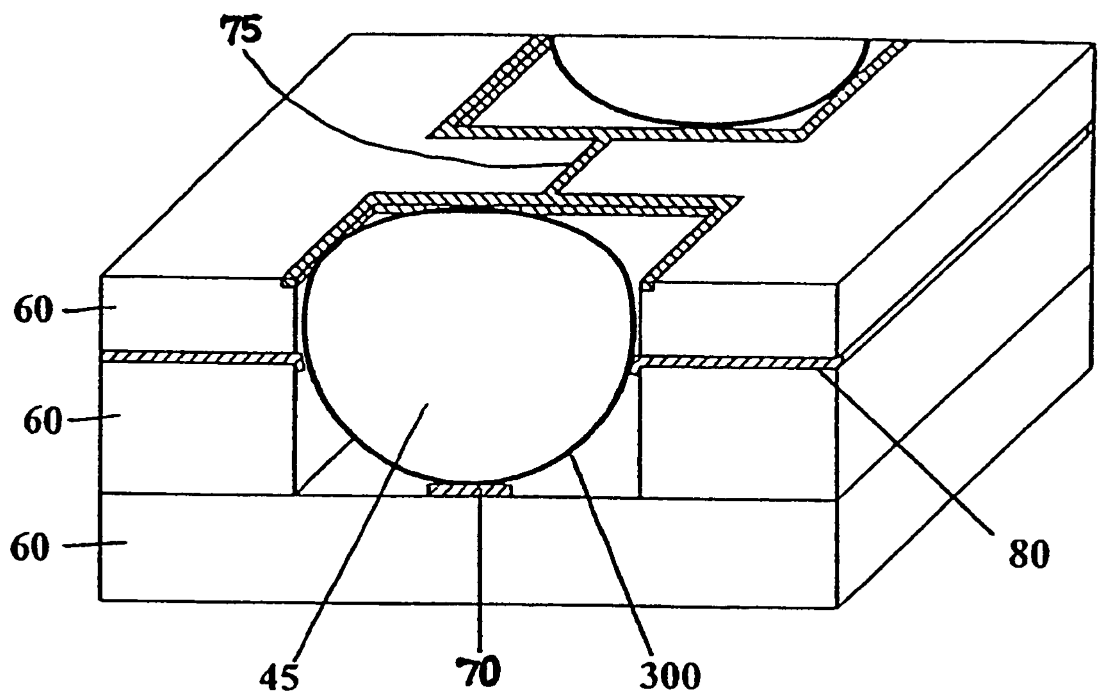
FIG. 7B is a cut-away of FIG. 7A showing in more detail the uppermost sustain electrode.
Figure 8:
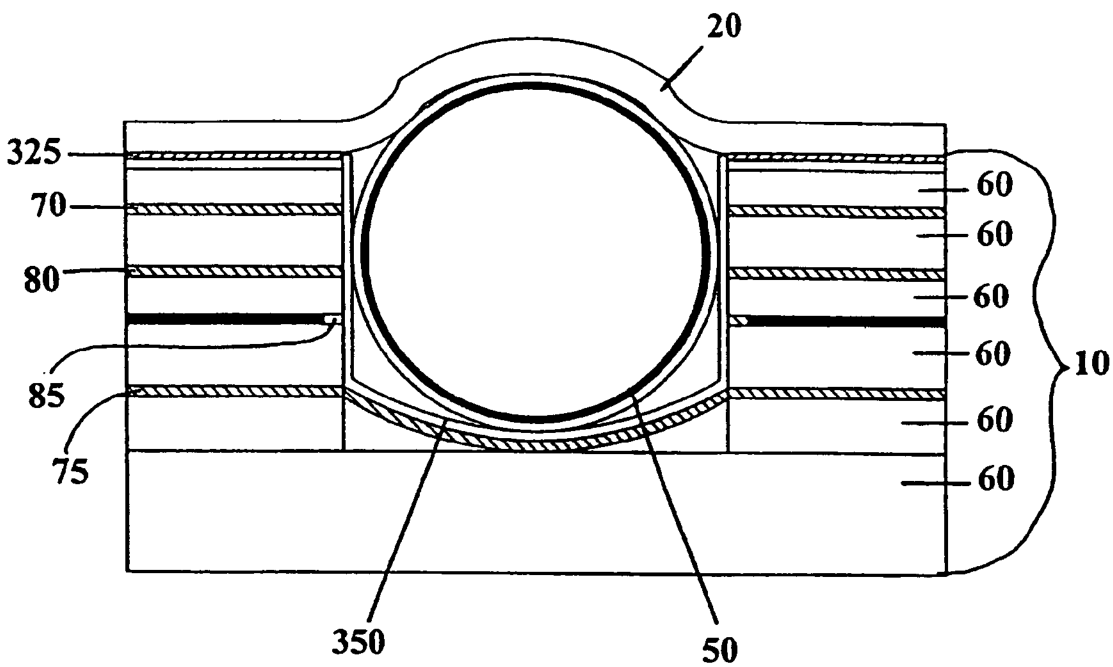
FIG. 8 depicts a portion of a light-emitting panel showing the basic socket structure of a socket formed from disposing a plurality of material layers and then selectively removing a portion of the material layers with the electrodes having an configuration with two sustain and two address electrodes, where the address electrodes are between the two, sustain electrodes.

In an embodiment where the first substrate 10 includes a plurality of material layers 60 and the cavities 55 are formed by selectively removing a portion of the material layers, at least two electrodes may be disposed on the first substrate 10, disposed within the material layers 60, disposed on the second substrate 20, or any combination thereof. In one embodiment, as shown in FIG. 6A, a first address electrode 80 is disposed within the material layers 60, a first sustain electrode 70 is disposed within the material layers 60, and a second sustain electrode 75 is disposed within the material layers 60, such that the first sustain electrode and the second sustain electrode are in a co-planar configuration. FIG. 6B is a cut-away of FIG. 6A showing the arrangement of the co-planar sustain electrodes 70 and 75. In another embodiment, as shown in FIG. 7A, a first sustain electrode 70 is disposed on the first substrate 10, a first address electrode 80 is disposed within the material layers 60, and a second sustain electrode 75 is disposed within the material layers 60, such that the first address electrode is located between the first sustain electrode and the second sustain electrode in a mid-plane configuration. FIG. 7B is a cut-away of FIG. 7A showing the first sustain electrode 70. As seen in FIG. 8, in a preferred embodiment of the present invention, a first sustain electrode 70 is disposed within the material layers 60, a first address electrode 80 is disposed within the material layers 60, a second address electrode 85 is disposed within the material layers 60, and a second sustain electrode 75 is disposed within the material layers 60, such that the first address electrode and the second address electrode are located between the first sustain electrode and the second sustain electrode.

Figure 9:
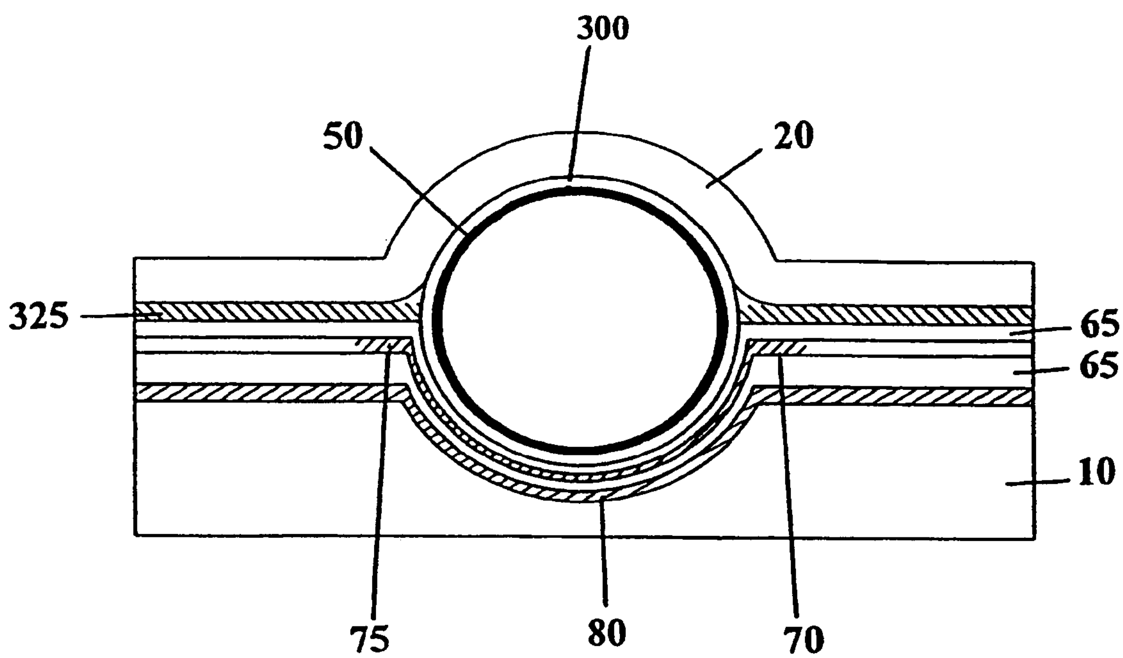
FIG. 9 depicts a portion of a light-emitting panel showing the basic socket structure of a socket formed from patterning a substrate and then disposing a plurality of material layers on the substrate so that the material layers conform to the shape of the cavity with the electrodes having a co-planar configuration.
Figure 10:
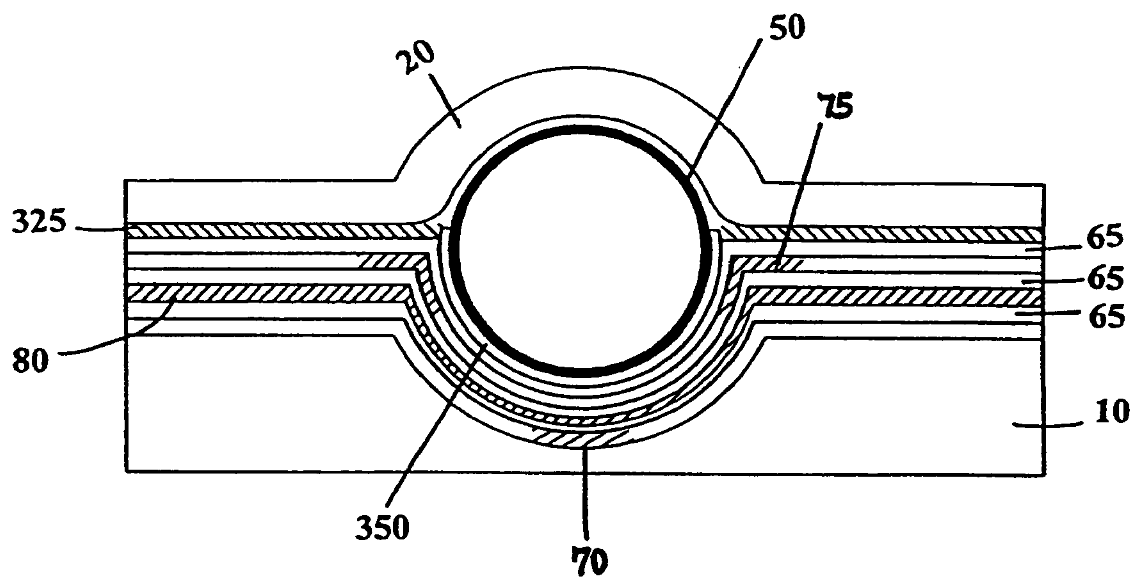
FIG. 10 depicts a portion of a light-emitting panel showing the basic socket structure of a socket formed from patterning a substrate and then disposing a plurality of material layers on the substrate so that the material layers conform to the shape of the cavity with the electrodes having a mid-plane configuration.
Figure 11:
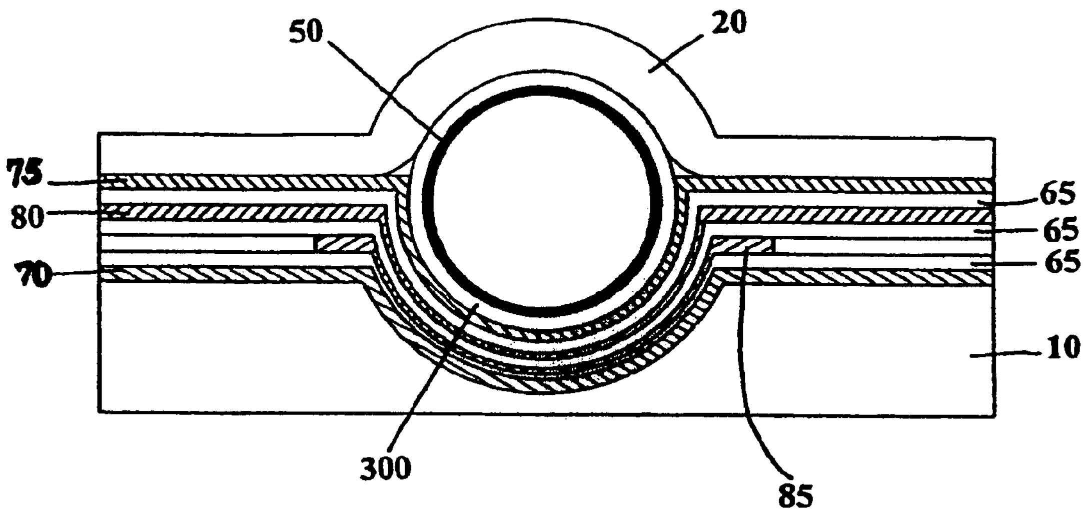
FIG. 11 depicts a portion of a light-emitting panel showing the basic socket structure of a socket formed from patterning a substrate and then disposing a plurality of material layers on the substrate so that the material layers conform to the shape of the cavity with the electrodes having a configuration with two sustain and two address electrodes, where the address electrodes are between the two sustain electrodes.

In an embodiment where the cavities 55 are patterned on the first substrate 10 and a plurality of material layers 65 are disposed on the first substrate 10 so that the material layers conform to the cavities 55, at least two electrodes may be disposed on the first substrate 10, at least partially disposed within the material layers 65, disposed on the second substrate 20, or any combination thereof. In one embodiment, as shown in FIG. 9, a first address electrode 80 is disposed on the first substrate 10, a first sustain electrode 70 is disposed within the material layers 65, and a second sustain electrode 75 is disposed within the material layers 65, such that the first sustain electrode and the second sustain electrode are in a co-planar configuration. In another embodiment, as shown in FIG. 10, a first sustain electrode 70 is disposed on the first substrate 10, a first address electrode 80 is disposed within the material layers 65, and a second sustain electrode 75 is disposed within the material layers 65, such that the first address electrode is located between the first sustain electrode and the second sustain electrode in a mid-plane configuration. As seen in FIG. 11, in a preferred embodiment of the present invention, a first sustain electrode 70 is disposed on the first substrate 10, a first address electrode 80 is disposed within the material layers 65, a second address electrode 85 is disposed within the material layers 65, and a second sustain electrode 75 is disposed within the material layers 65, such that the first address electrode and the second address electrode are located between the first sustain electrode and the second sustain electrode.

Figure 13:
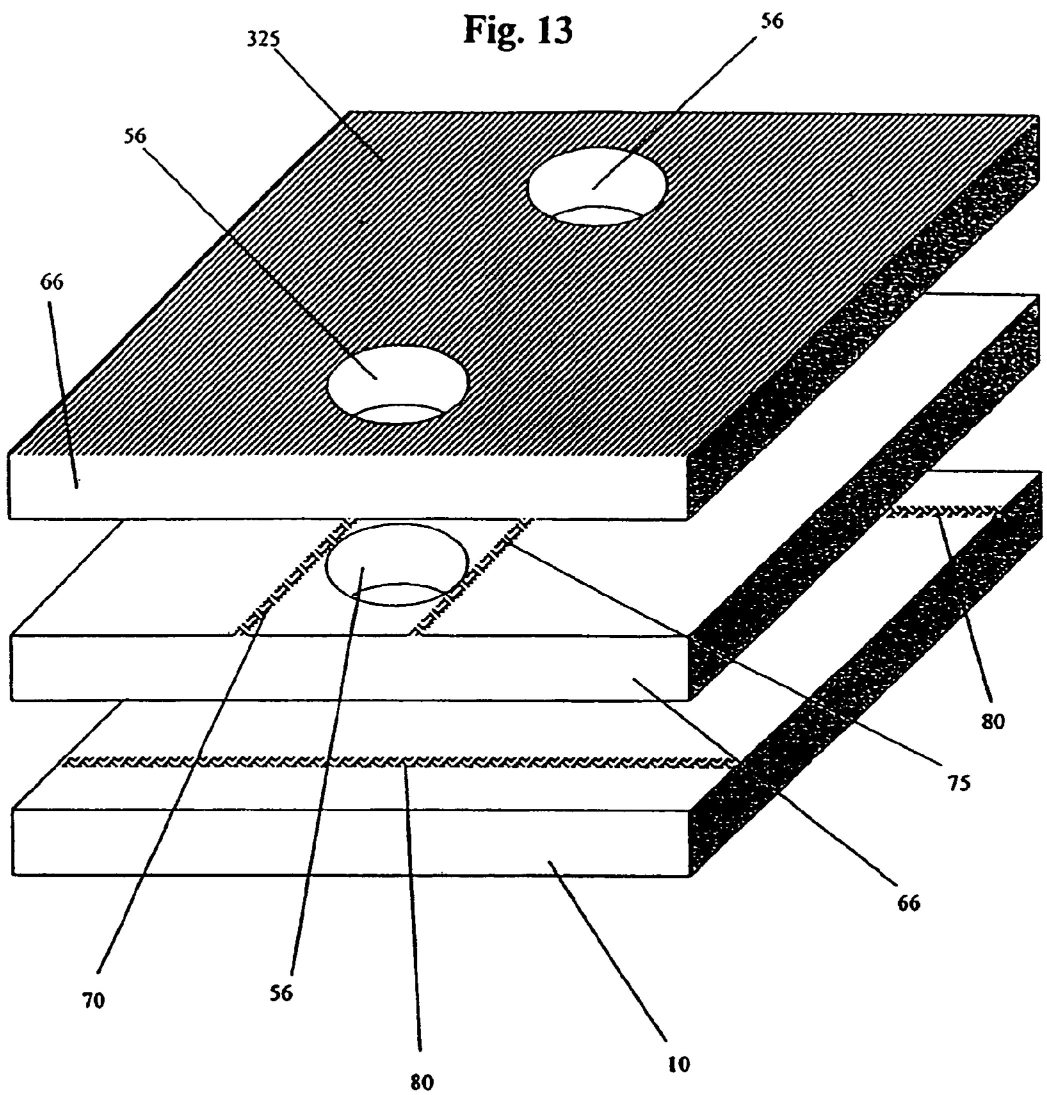
FIG. 13 shows an exploded view of a portion of a light-emitting panel showing the basic socket structure of a socket formed by disposing a plurality of material layers with aligned apertures on a substrate with the electrodes having a co-planar configuration.
Figure 14:
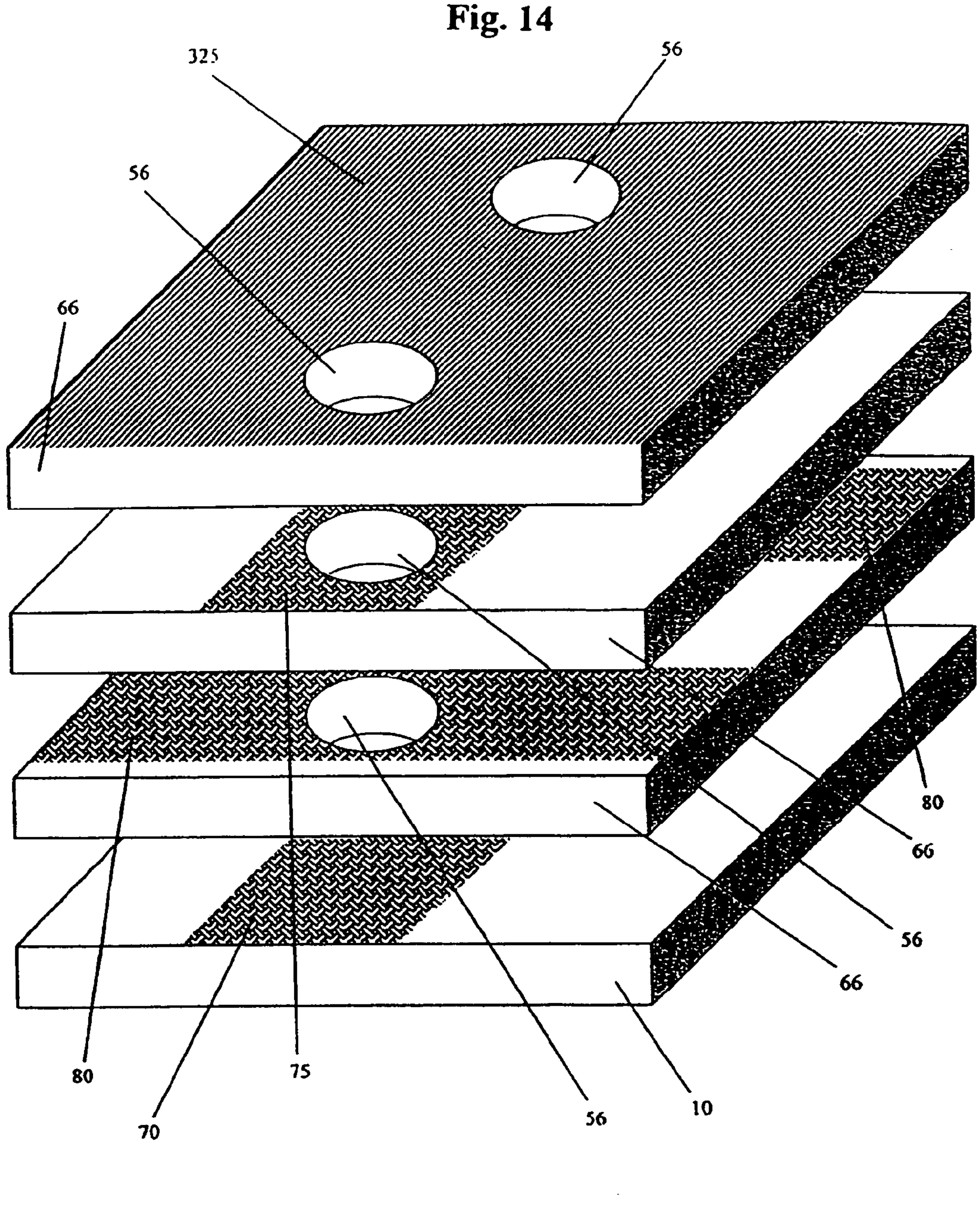
FIG. 14 shows an exploded view of a portion of a light-emitting panel showing the basic socket structure of a socket formed by disposing a plurality of material layers with aligned apertures on a substrate with the electrodes having a mid-plane configuration.
Figure 15:
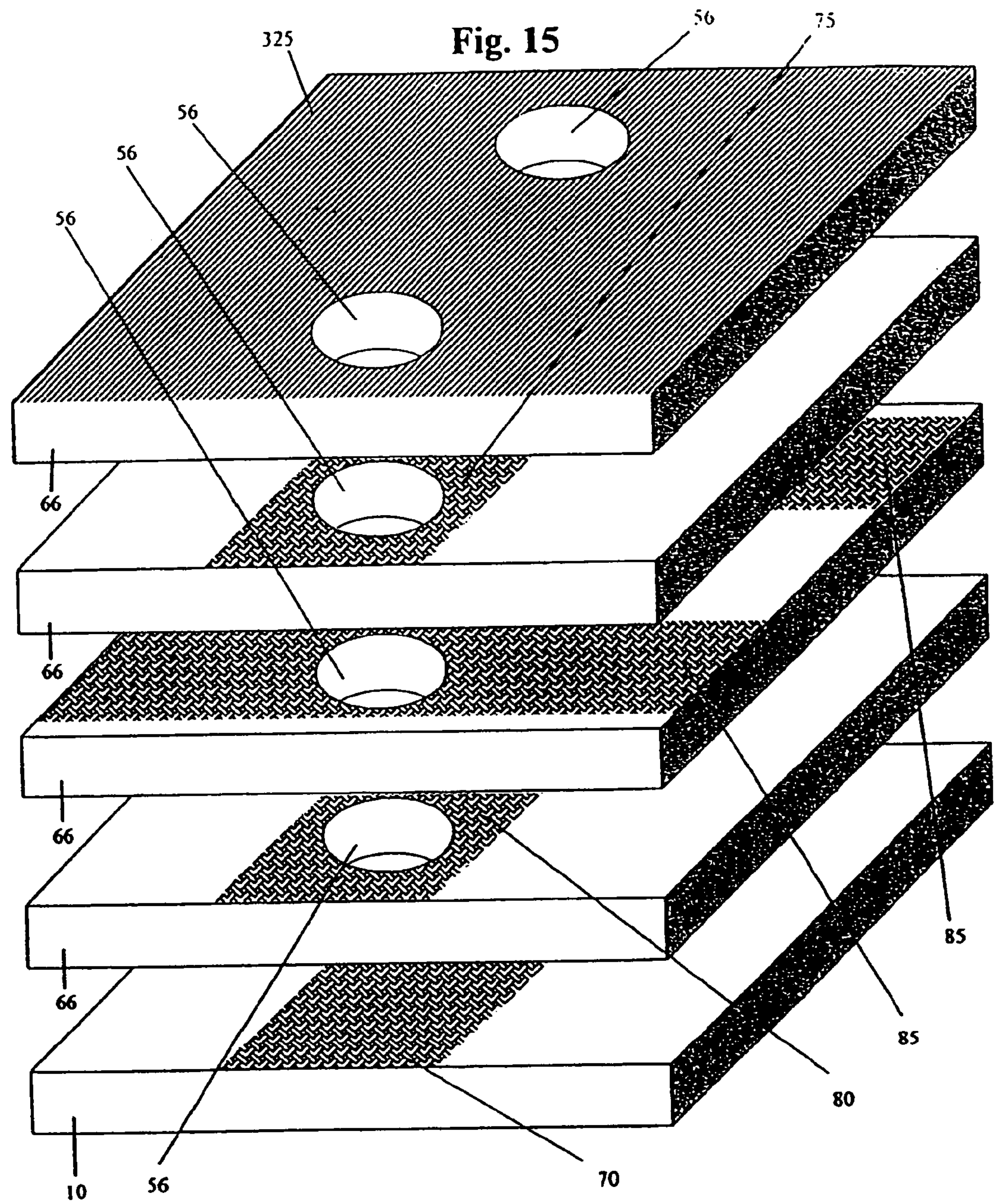
FIG. 15 shows an exploded view of a portion of a light-emitting panel showing the basic socket structure of a socket formed by disposing a plurality of material layers with aligned apertures on a substrate with electrodes having a configuration with two sustain and two address electrodes, where the address electrodes are between the two sustain electrodes.

In an embodiment where a plurality of material layers 66 with aligned apertures 56 are disposed on a first substrate 10 thereby creating the cavities 55, at least two electrodes may be disposed on the first substrate 10, at least partially disposed within the material layers 65, disposed on the second substrate 20, or any combination thereof. In one embodiment, as shown in FIG. 13, a first address electrode 80 is disposed on the first substrate 10, a first sustain electrode 70 is disposed within the material layers 66, and a second sustain electrode 75 is disposed within the material layers 66, such that the first sustain electrode and the second sustain electrode are in a co-planar configuration. In another embodiment, as shown in FIG. 14, a first sustain electrode 70 is disposed on the first substrate 10, a first address electrode 80 is disposed within the material layers 66, and a second sustain electrode 75 is disposed within the material layers 66, such that the first address electrode is located between the first sustain electrode and the second sustain electrode in a mid-plane configuration. As seen in FIG. 15, in a preferred embodiment of the present invention, a first sustain electrode 70 is disposed on the first substrate 10, a first address electrode 80 is disposed within the material layers 66, a second address electrode 85 is disposed within the material layers 66, and a second sustain electrode 75 is disposed within the material layers 66, such that the first address electrode and the second address electrode are located between the first sustain electrode and the second sustain electrode.

Other embodiments and uses of the present invention will be apparent to those skilled in the art from consideration of this application and practice of the invention disclosed herein. The present description and examples should be considered exemplary only, with the true scope and spirit of the invention being indicated by the following claims. As will be understood by those of ordinary skill in the art, variations and modifications of each of the disclosed embodiments, including combinations thereof, can be made within the scope of this invention as defined by the following claims.

What is claimed is:

1. A light-emitting panel comprising:

a substrate containing a plurality of cavities arranged in a pre-determined pattern, the pre-determined pattern consists of a plurality of groups of cavities, wherein the plurality of groups of cavities are uniformly spaced, one from another, within the substrate;

at least three cavities uniformly spaced one from another forming each of the plurality of groups of cavities; and a micro-component having ionizable gas therein within each of the at least three cavities, wherein each of the micro-components within each of the at least three cavities emits visible radiation at a different wavelength in response to an application of a voltage thereto.

2. The light-emitting panel of claim 1, wherein the different wavelengths are selected from the group consisting of visible radiation in the blue, green and red spectra.

3. A light emitting panel comprising:

a substrate containing a plurality of cavities formed therein;

at least a first, second and third micro-component arranged within each of the plurality of cavities, wherein each of the first, second and third micro-components contains an ionizable gas, and further wherein each of the first, second, and third micro-components emits visible radiation of a different wavelength; and at least one set of electrodes arranged within each of the plurality of cavities for selectively ionizing the gas within each of the first, second, and third microcomponents.

4. The light emitting panel of claim 3, wherein the plurality of cavities are uniformly spaced apart from each other.

5. The light emitting panel of claim 3, wherein the plurality of cavities are non-uniformly spaced apart from each other.

6. The light-emitting panel of claim 3, wherein the different wavelengths are selected from the group consisting of visible radiation in the blue, green and red spectra.

* * * * *